United States Patent [19]

Olsen et al.

[11] Patent Number: 4,519,028
[45] Date of Patent: May 21, 1985

[54] CPU WITH MULTI-STAGE MODE REGISTER FOR DEFINING CPU OPERATING ENVIRONMENT INCLUDING CHARGING ITS COMMUNICATIONS PROTOCOL

[75] Inventors: Richard E. Olsen, Framingham; Dwight C. Baker, Hudson, both of Mass.

[73] Assignee: Digital Equipment Corporation, Maynard, Mass.

[21] Appl. No.: 234,926

[22] Filed: Feb. 17, 1981

[51] Int. Cl.³ .................................................. G06F 9/00
[52] U.S. Cl. ................................................... 364/200
[58] Field of Search ... 364/200 MS File, 900 MS File

[56] References Cited

U.S. PATENT DOCUMENTS

| 4,012,725 | 3/1977 | Spangler et al. | 364/200 |
| 4,152,761 | 5/1979 | Louie | 364/200 |
| 4,206,503 | 6/1980 | Woods et al. | 364/200 |
| 4,232,366 | 11/1980 | Levy et al. | 364/200 |
| 4,236,204 | 11/1980 | Groves | 364/200 |
| 4,236,206 | 11/1980 | Strecker et al. | 364/200 |
| 4,276,594 | 6/1981 | Morley | 364/200 |
| 4,293,907 | 10/1981 | Huang et al. | 364/200 |
| 4,300,208 | 11/1981 | Jasmin et al. | 364/900 |
| 4,313,160 | 1/1982 | Kaufman et al. | 364/200 |
| 4,344,129 | 8/1982 | Asada et al. | 364/200 |
| 4,384,327 | 5/1983 | Conway et al. | 364/200 |
| 4,394,734 | 7/1983 | Norgen et al. | 364/200 |

Primary Examiner—James D. Thomas
Assistant Examiner—Archie E. Williams, Jr.
Attorney, Agent, or Firm—Cesari and McKenna

[57] ABSTRACT

A central processor unit (CPU) is capable of being connected in data processing systems having diverse logical operating characteristics. The CPU contains an operating mode register that has stages that identify various logical operating conditions in the data processing system, and modify the operation of the central processor unit in accordance therewith.

12 Claims, 35 Drawing Figures

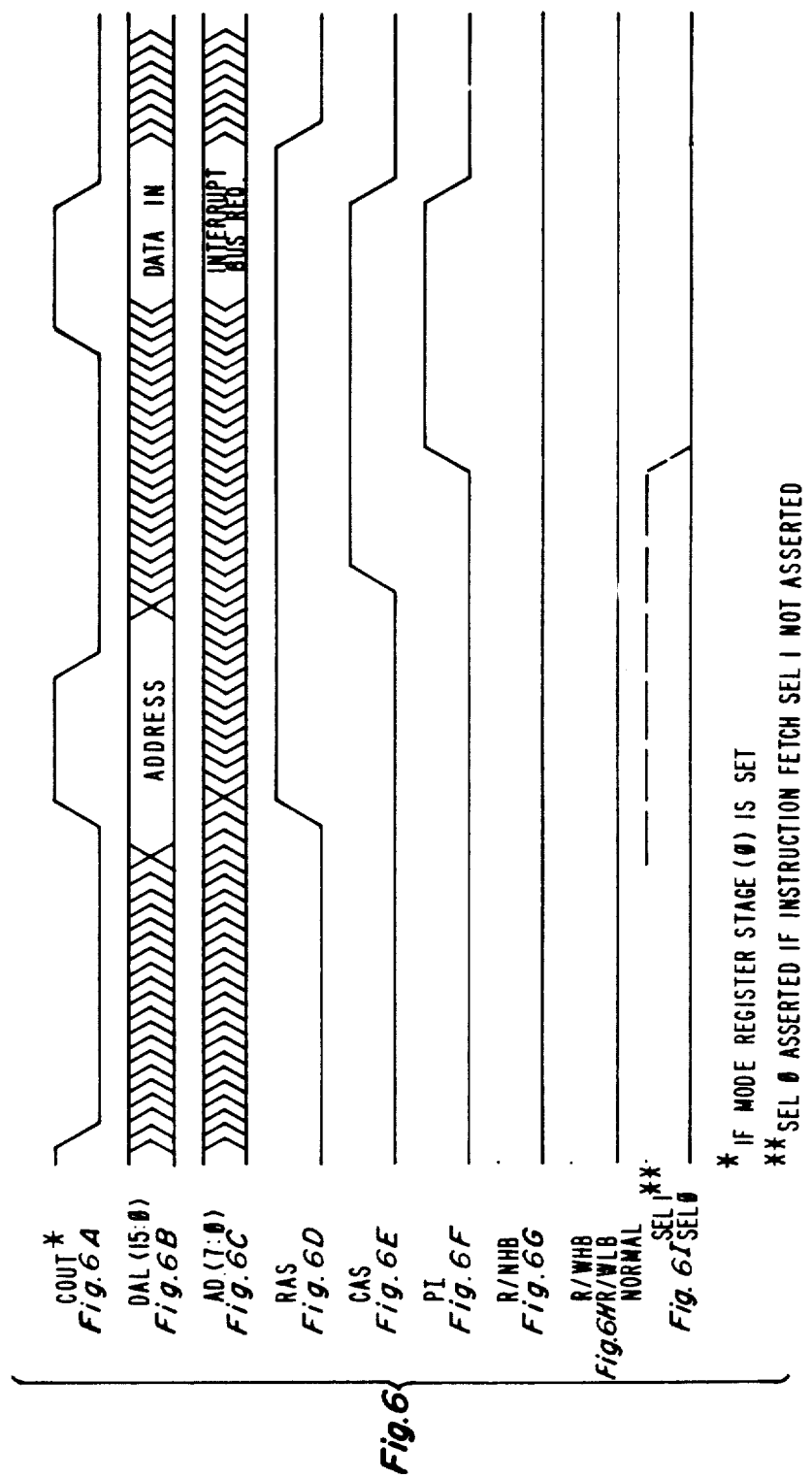

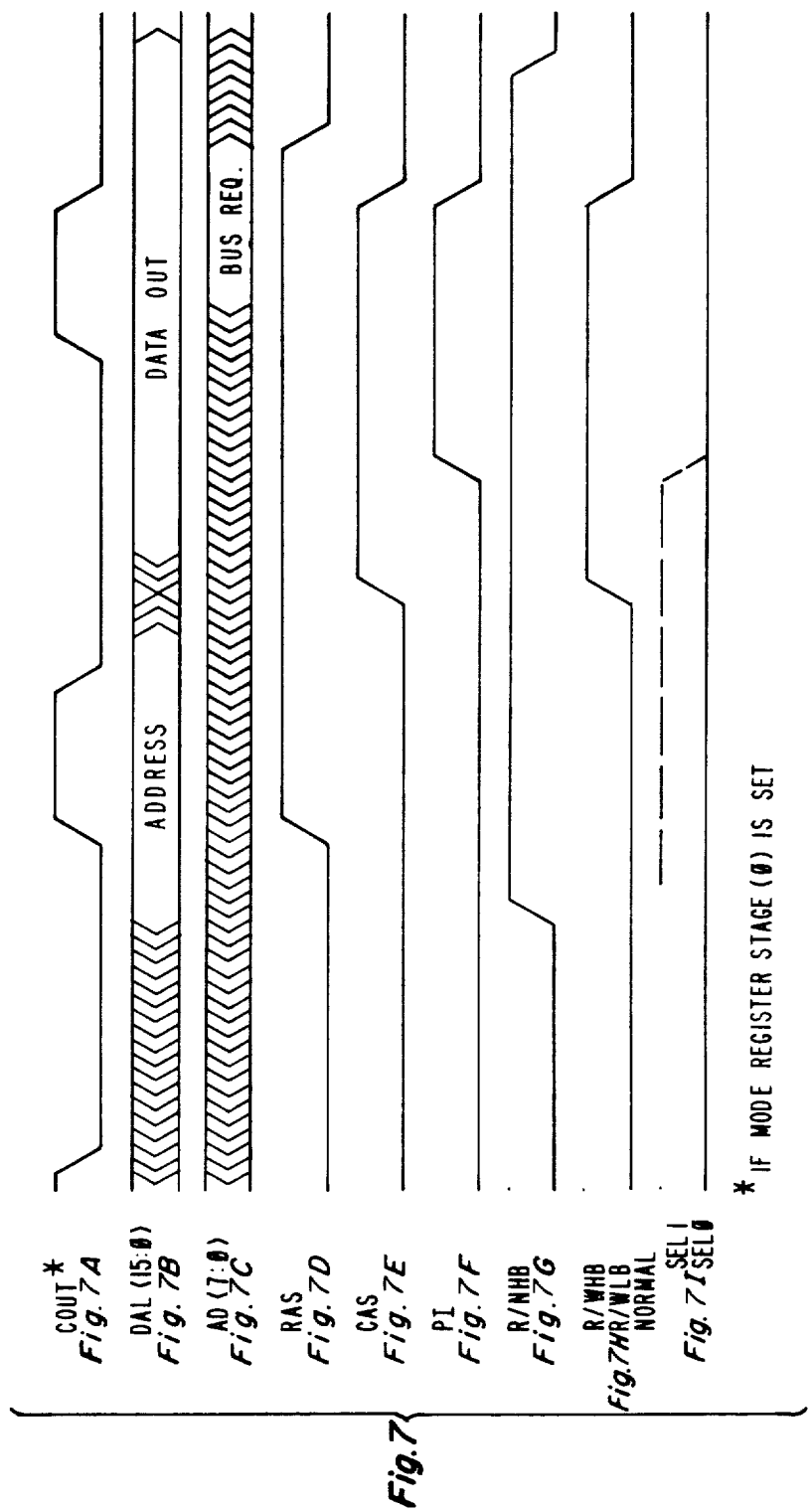

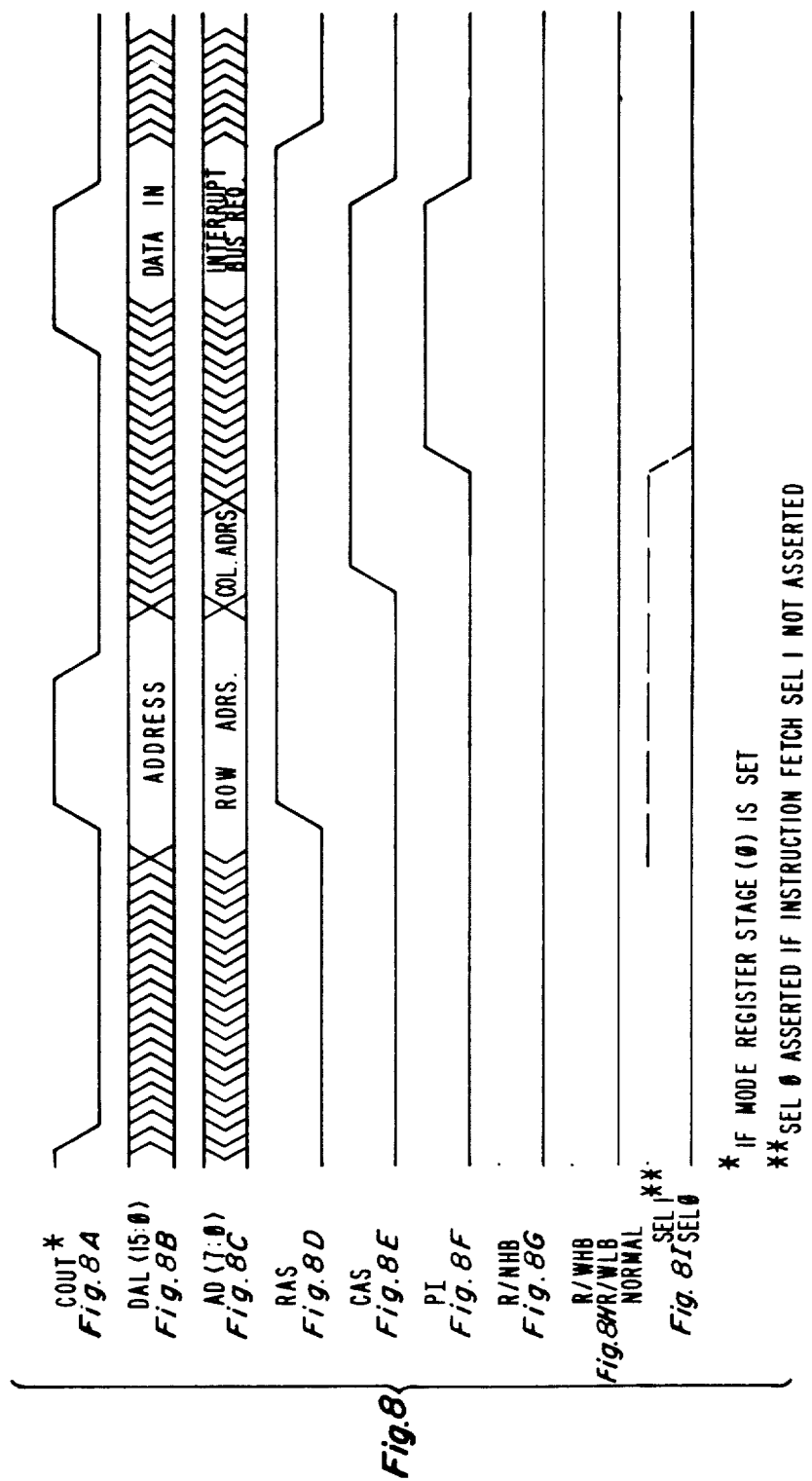

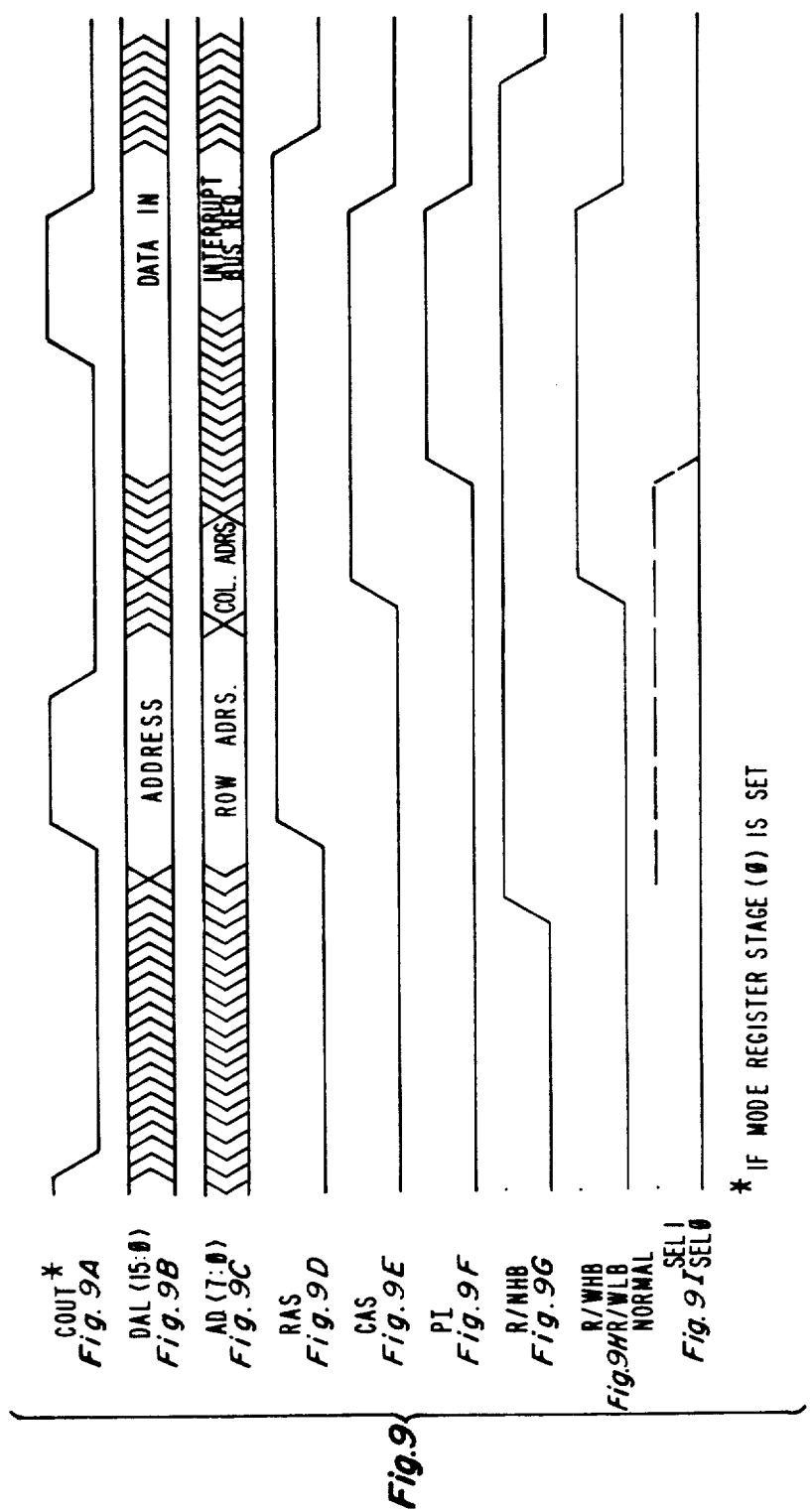

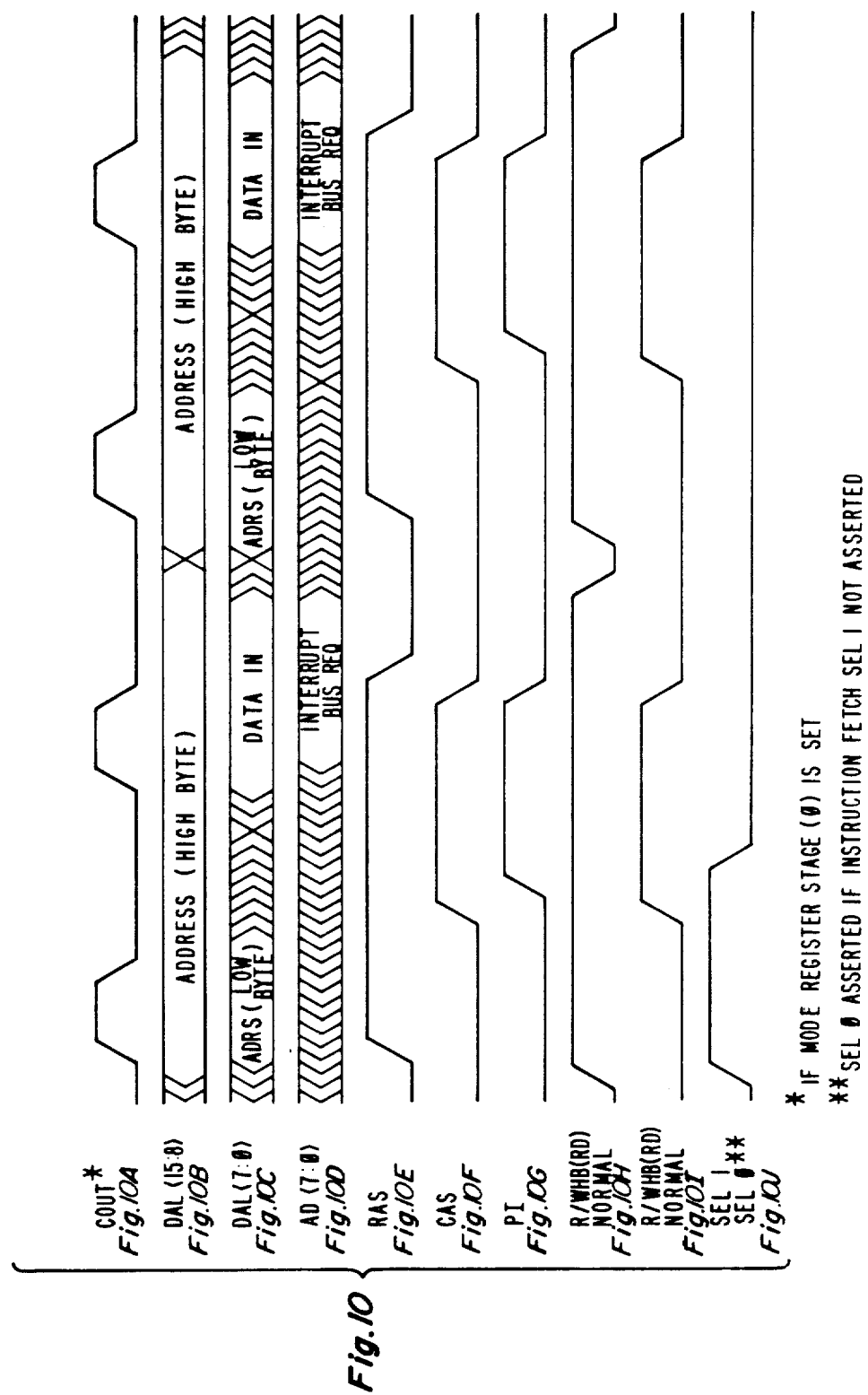

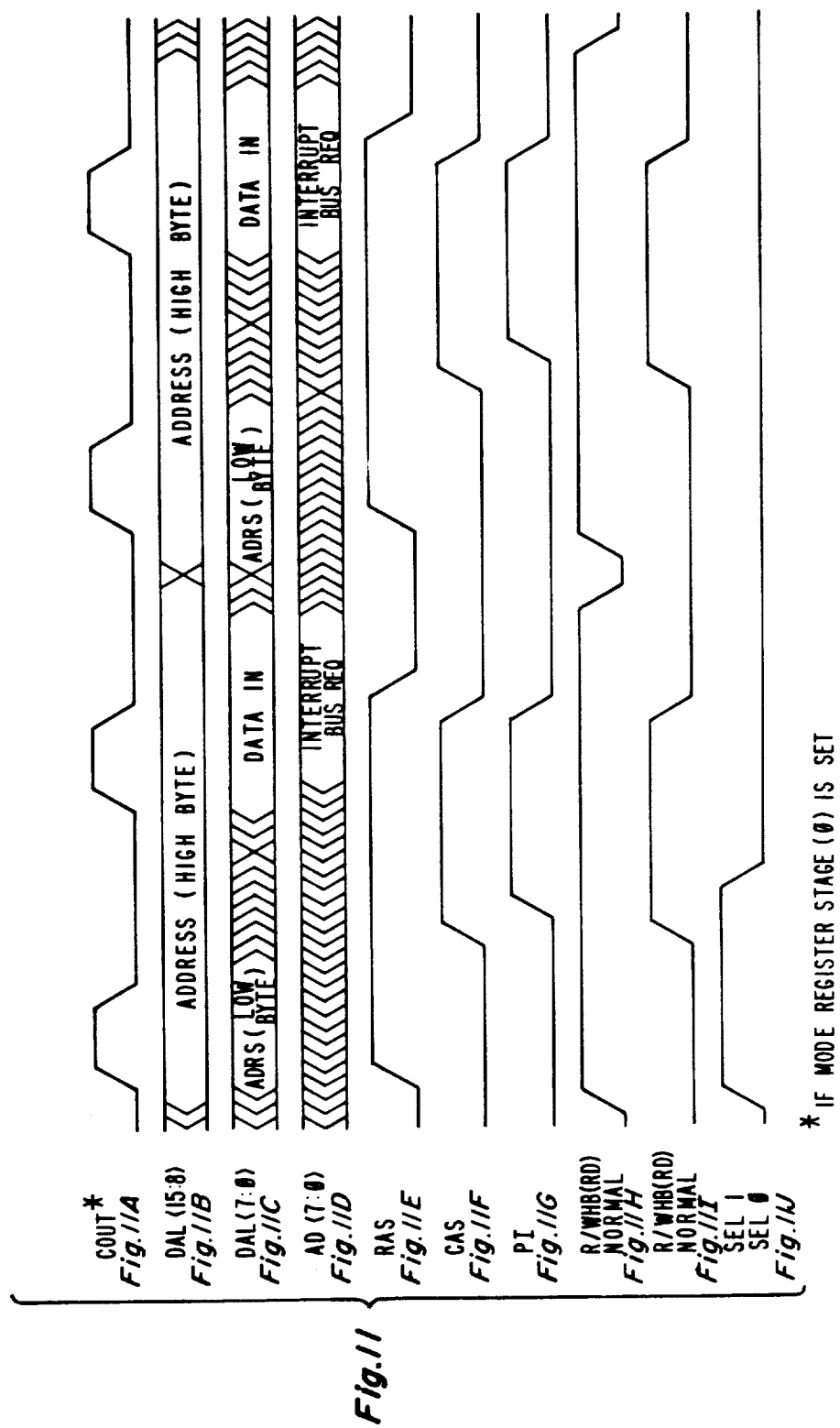

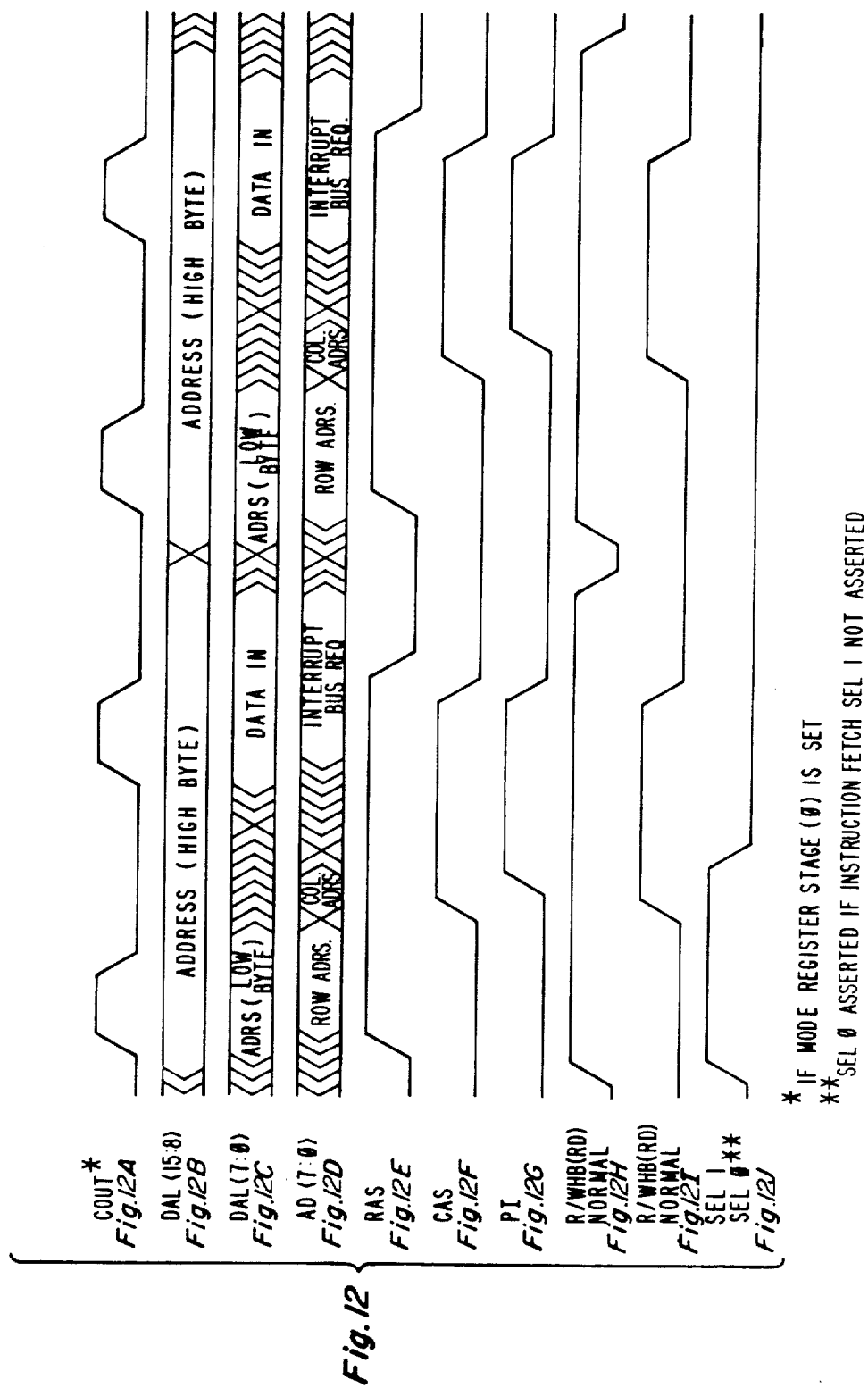

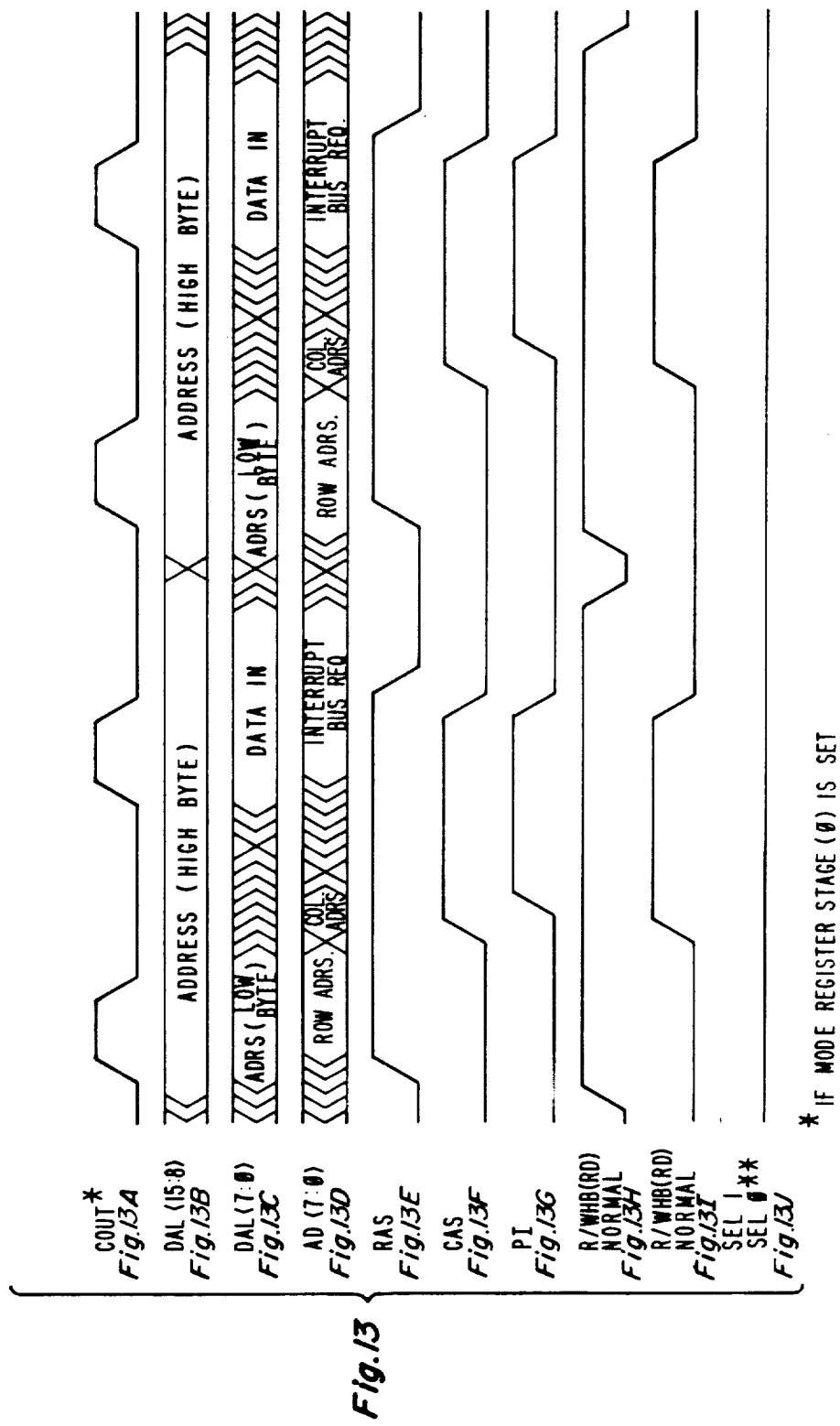

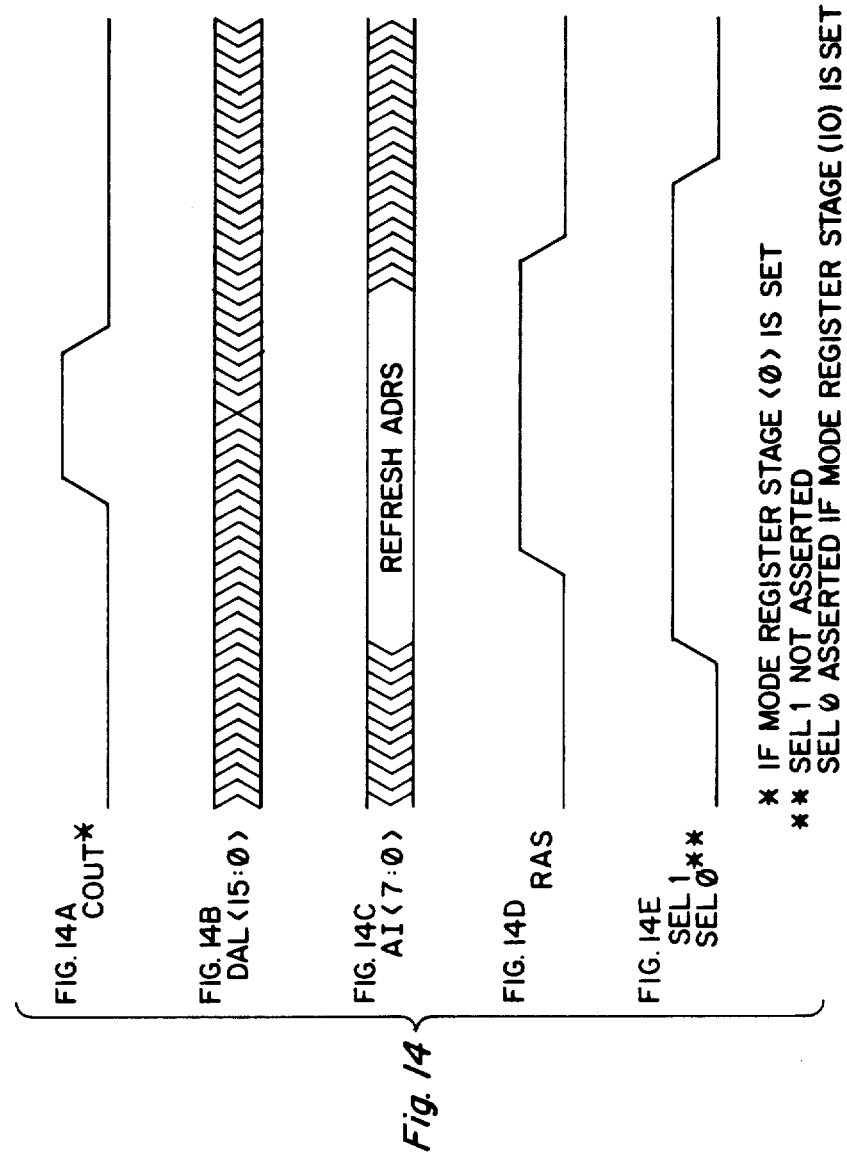

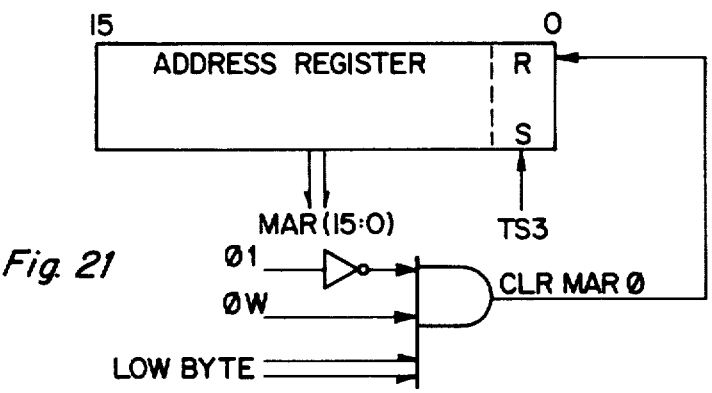
Fig. 21
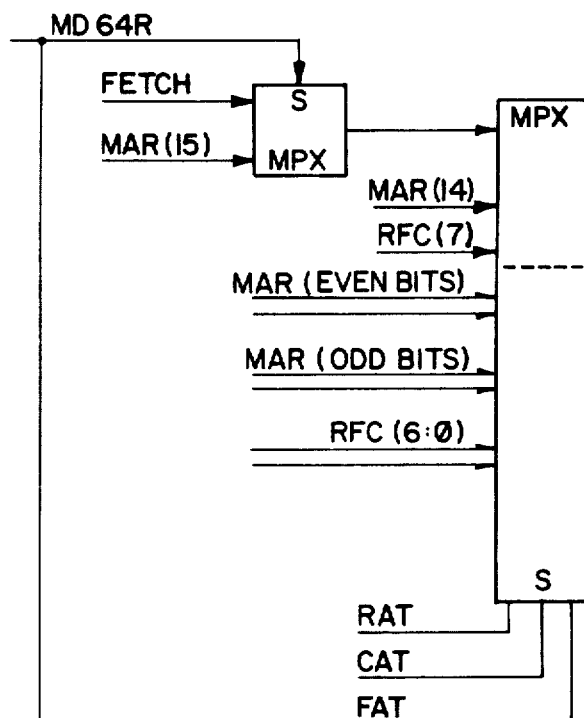
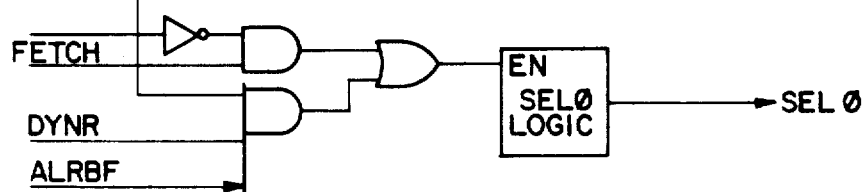
Fig. 22

| INT PRI | CP3 | CP2 | CP1 | CP0 | VECTOR ADRS* | |
|---|---|---|---|---|---|---|
| 1  | A | A | A | A | 7 | 140 |
| 2  | A | A | A | • | 7 | 144 |
| 3  | A | A | • | A | 7 | 150 |
| 4  | A | A | • | • | 7 | 154 |
| 5  | A | • | A | A | 6 | 100 |
| 6  | A | • | A | • | 6 | 104 |
| 7  | A | • | • | A | 6 | 110 |
| 8  | A | • | • | • | 6 | 114 |
| 9  | • | A | A | A | 5 | 120 |
| 10 | • | A | A | • | 5 | 124 |
| 11 | • | A | • | A | 5 | 130 |
| 12 | • | A | • | • | 5 | 134 |
| 13 | • | • | A | A | 4 | 60 |
| 14 | • | • | A | • | 4 | 64 |
| 15 | • | • | • | A | 4 | 70 |
|    | • | • | • | • | NO INTERRUPT | |

A = ASSERTED
• = NOT ASSERTED
\* IF VEC IS NOT ASSERTED

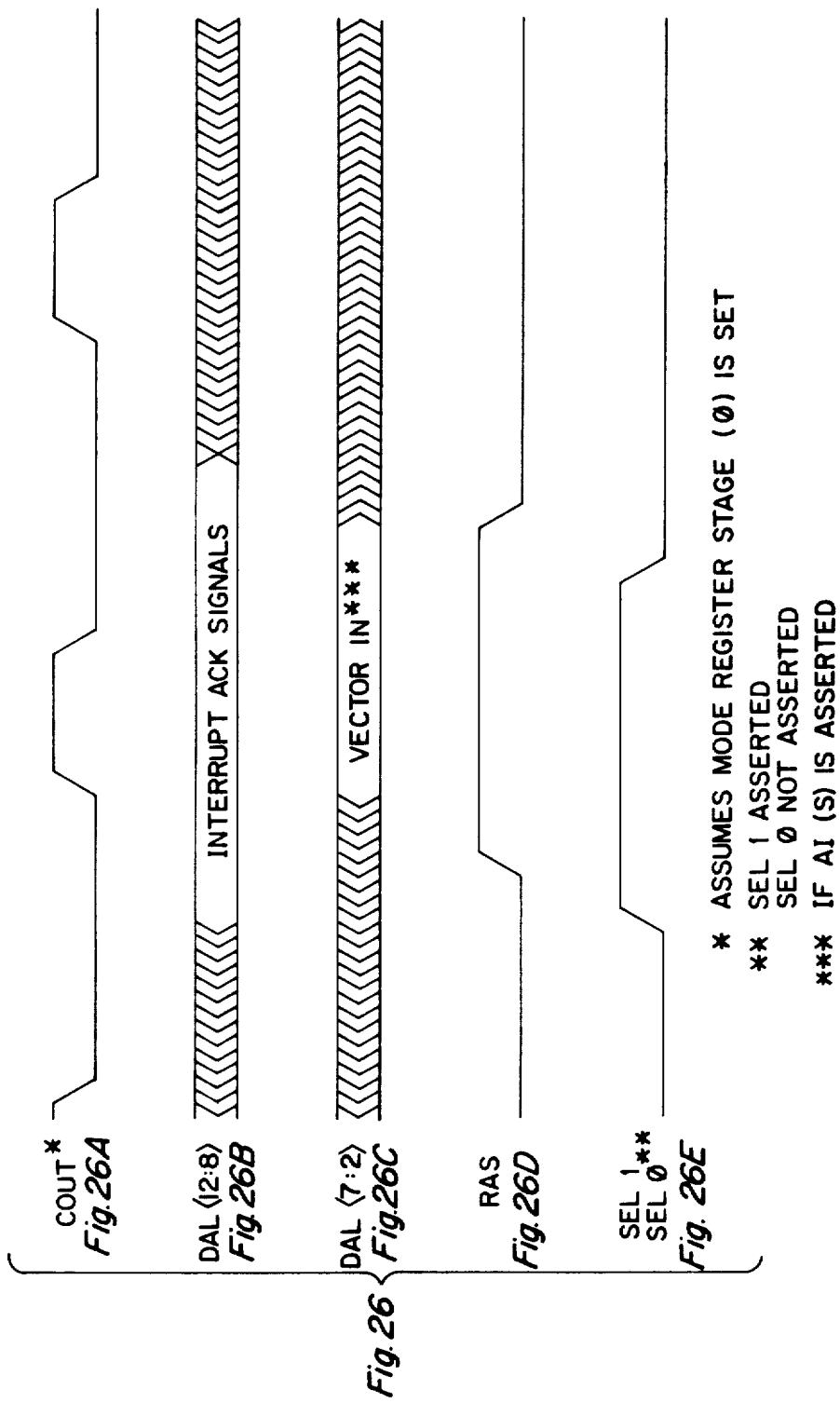

CPU WITH MULTI-STAGE MODE REGISTER FOR DEFINING CPU OPERATING ENVIRONMENT INCLUDING CHARGING ITS COMMUNICATIONS PROTOCOL

CROSS REFERENCES TO RELATED U.S. PATENT APPLICATIONS AND PATENTS

References are made in the Description of an Illustrative Embodiment to the following patents and patent applications which are assigned to the same assignee as the following invention and incorporated herein by reference.

U.S. patent application Ser. No. 234,904 filed Feb. 17, 1981 for a CENTRAL PROCESSING UNIT and assigned to the same assignee as the present invention.

U.S. patent application Ser. No. 234,847 filed Feb. 17, 1981 for a CENTRAL PROCESSING UNIT and assigned to the same assignee as the present invention.

U.S. Pat. No. 4,236,207 issued Nov. 25, 1980 for a MEMORY INITIALIZATION CIRCUIT and assigned to the same assignee as the present invention.

U.S. Pat. No. 3,999,163 issued Dec. 21, 1976 for a SECONDARY STORAGE FACILITY FOR DATA PROCESSING SYSTEM and assigned to the same assignee as the present invention.

BACKGROUND OF THE INVENTION

1. Field of the Invention

This invention relates generally to the field of digital data processing systems, and more specifically to a central processing unit for connection in data processing systems having system buses with diverse characteristics.

2. Description of the Prior Art

A digital data processing system generally includes three basic elements: a memory element, an input/output element, and a processor element connected by one or more buses. The memory element stores information in addressable storage locations. This information includes both data and instructions for processing the data. The processor element causes information to be transferred between it and the memory element, interprets the incoming information as either data or instructions, and processes the data in accordance with the instructions. An input/output element also communicates with the memory element in order to transfer information into the system and to obtain the processed information from it. The input/output elements normally operate in accordance with control information supplied to it by the processor element. The input/output elements may include operator consoles, printers or teletypewriters, or may also include secondary memory storage units such as disk drives or tape drives.

A data processing system may be designed to transfer information over one system bus to which all of the elements are connected. The system bus itself is designed to have certain predetermined logical and electrical characteristics. The signal paths for transferring information signals and for transferring control signals that control the operation of the elements in respect of the information signals are logical factors that determine the bus' logical characteristics. The components selected to be used in the physical implementation of the system determine the electrical characteristics. While the electrical characteristics of the components are reasonably standardized, the logical characteristics are not standardized, but are generally determined by the system design.

A processor is typically designed to operate in a data processing system having particular logical bus characteristics. These characteristics determine, inter alia, whether a bus has signal paths for transferring either one byte, multiple bytes in parallel, what bus control signals occur at particular times, the maximum number of addressable storage locations that may be provided in the memory, and the sequence in which address signals are provided, and whether timing signals define timing cycles of a particular duration.

For example, in a data processing system having a bus with signal paths for transferring single bytes of information in parallel to and from a memory, it would be necessary to develop complex arrangements to facilitate transfer by a processor designed to operate in a system in which a word comprising two bytes was transferred in parallel. These arrangements would include circuitry for arranging the separate bytes of each word in memory. Alternatively, the processor could ignore one of the bytes of each word during processing if only one information byte is transferred in parallel, but this could be wasteful in a processor designed to operate on words of information.

As another example, the maximum size of the memory element determines the number of address bits required to physically address a particular storage location. A memory element having 65,536 separately addressable storage locations (typically referred to as a "64K" memory) requires sixteen address bits, whereas a memory having as many as 32,768 separately addressable storage locations (a "32K" memory) requires only fifteen address bits. A processor designed to work in a system having at most a 32K memory thus will not work with a 64K memory without some type of memory address extension mechanism.

Similarly, different memory elements may require address signals to be provided in different patterns. Some memory elements must receive all of the address bits simultaneously, whereas other memories may require the bits to be divided into portions denominated row address bits and column address bits, and transferred sequentially. The former arrangement is typically a characteristic of a static memory, whereas the latter arrangement is typically a characteristic of a dynamic memory. Another difference between the static and dynamic memories is that the contents of the storage locations of dynamic memories may decay over time, whereas those of static memories do not. To prevent the loss of the contents of the dynamic memory's storage locations, refreshing operations are performed in the system. Such refreshing operations may be initiated by the memory itself, however, often they are initiated by the processor.

Different data processing systems also define the timing of certain bus control signals, for example, a transfer direction, or "read/write", control signal. Some systems require the read/write control signal to be provided simultaneously with the address. Others require the read/write control signal to be provided only after the address signals are transferred. Normally, a processor does not provide such control signals having both timings.

The various elements of data processing system are often designed to operate in response to internal timing signals that have a particular relationship to timing signals that are generated in the system and transferred over the bus. For example, in some data processing systems timing signals generated by the processor control all the timing in the system. In other data processing systems, a timing standard that is external to the processor produces timing signals that the processor and other elements receive and convert to their internal timing signals.

Finally, a processor, particularly a processor designed to operate with a synchronous bus, is usually designed to operate with a characteristic timing interval or cycle having a particular maximum duration. In a synchronous bus, the signals transferred over the bus have a particular relationship to certain timing signals that define the timing intervals or cycles. The duration of the timing signals or intervals is normally determined to reflect the speed with which a memory element included in the system can normally transfer information to or retrieve information from an addressed location. Typically a processor having a long internal timing cycle is not connected in a system having faster memories, because such memories are usually more expensive than the slower memories, and a faster memory is not required in a system having such a long internal timing cycle. On the other hand, a processor having a short internal timing cycle would not normally be connected to a memory requiring longer timing cycles without significant modification.

SUMMARY

It is therefore an object of the invention to provide a central processing unit adapted to connect in data processing systems having diverse logical characteristics.

It is a further object to provide a central processing unit capable of connection to data processing systems having diverse sizes and types of memory elements.

It is a further object to provide a central processing unit capable of connection in data processing systems having system buses capable of transferring a byte or multiple bytes of information in parallel.

It is a further object of the invention to provide a central processing unit capable of providing timing signals that define timing intervals of various durations.

It is a further object to provide a central processing unit that provides timing signals having diverse relationships to internal timing signals generated by the central processing unit.

It is yet another object to provide a central processing unit capable of providing transfer control signals at diverse times during a transfer.

In brief summary, this invention provides a central processing unit including an operating mode register that includes independently-conditioned stages each identifying a logical characteristic of the data processing system. The central processing unit modifies the operation in response to this mode information.

In one specific embodiment, the operating mode register indicates whether a bus has signal paths for transferring one or two bytes of information in parallel, whether the memory is static or dynamic, the size of the memory, the relative timing of a bus control signal, the length of a timing interval, and so forth. The operating mode register also specifies an address at which the processor starts operation.

BRIEF DESCRIPTION OF THE DRAWINGS

The invention is pointed out with particularity in the appended claims. The above and further objects and advantages of the invention may be better understood by referring to the following description taken in conjunction with the accompanying drawings, in which:

FIG. 4 comprising

FIGS. 6 through 13 are timing diagrams detailing the signals produced by the central processor unit shown in FIG. 2 to effect transfers of information over the system bus shown in FIG. 1;

FIG. 14, comprising FIGS. 14A through 14E, is a timing diagram detailing the signals produced by the central processor unit shown in FIG. 2 to effect a refresh operation in the memory unit shown in FIG. 1, if the memory unit is a dynamic memory;

FIG. 21 is a schematic diagram detailing circuitry in connection with the address register in central processor unit shown in FIG. 2;

FIG. 22 is a schematic diagram detailing circuitry in connection with the address multiplexer in the central processor unit shown in FIG. 2;

FIG. 26, comprising FIGS. 26A-26E, is a timing diagram detailing signals transferred during an IACK interrupt acknowledge transaction over the system bus shown in FIGS. 1 and 2; and FIG. 27, comprises FIGS. 27A-27C and is a flow diagram showing an operating sequence performed by the central processing unit shown in FIG. 2 in connection with processing interrupt service routines.

DESCRIPTION OF AN ILLUSTRATIVE EMBODIMENT

1. General

Figure 1:
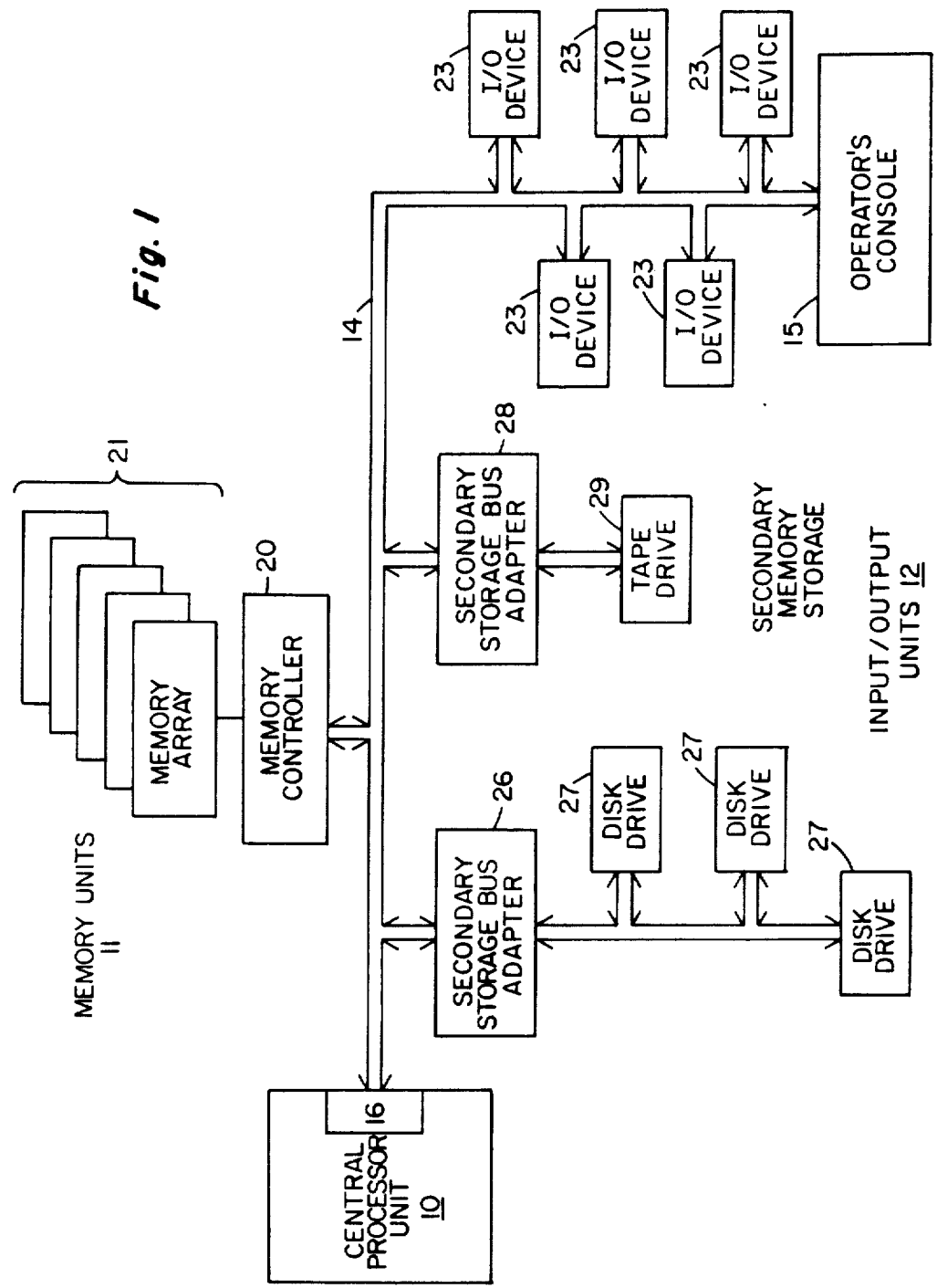
FIG. 1 is a block diagram of a digital data processing system including a central processor unit according to this invention.

As exemplified in FIG. 1, the basic elements of a data processing system including a central processor unit 10 according to the invention, memory units 11 and input/output (I/O) units 12. Input/output units 12 may include one or more secondary memory storage units 13. Central processor unit 10, memory units 11 and input/output units 12 are all connected by a system bus 14.

The central processor unit 10 includes a bus interface 16 and other conventional circuits, that normally are physically located in the central processor unit 10. All communications between the central processor unit 10 and the bus 14 are through bus interface 16.

The memory unit 11 includes a memory controller 20 which connects to a plurality of memory arrays 21. Each memory array contains addressable storage locations and the controller 20 includes circuitry for obtaining access to a particular storage location specified by the processor or by any other element attempting to make a transfer with the memory unit 11. The controller 20 also includes circuitry for retrieving the contents of an addressed location, and for storing information therein. One specific embodiment of a memory unit 11 is disclosed in U.S. Pat. No. 4,236,207 issued Nov. 25, 1980.

Several types of input/output units 12 are shown. Several input/output devices 23, such as, for example, printers or video display terminals, can be connected to the bus 14. An operator's console 15 may also be connected to input/output bus 25. The operator's console 15 enables the operator to examine and deposit data, halt the operation of the central processor unit 10, or step the central processor unit through a sequence of program instructions. It also enables an operator to initialize the system through a bootstrap procedure and perform various diagnostic tests on the entire data processing system.

The secondary memory storage units 13 may include a secondary storage bus adapter 26 and a plurality of disk drives 27. Furthermore, another secondary storage bus adapter 28 may connect to one or more tape drives 29. The interconnection of the secondary storage bus adapters 26 and 28 to the respective disk drives 27 and tape drive 29, in one specific embodiment, is disclosed in U.S. Pat. No. 3,999,163, with the secondary storage bus adapters 26 and 28 constituting the controllers for the disk drives 27 and tape drive 29, respectively.

Bus 14 interconnects the various units or elements of the data processing system. Typically, a bus comprises several conductors in parallel. Some of the conductors transfer information signals among the elements of the system. Other conductors transfer signals that control the transfer of the information signals. The bus may also include conductors that transfer certain system control signals that indicate when certain events occur in the various elements of the system that require attention by the processor.

The information signals constitute the contents of the various addressable storage locations in the memory unit 11 or that are be present in other elements of the system. The transfer control signals include address signals that identify the storage location whose contents are to be transferred, and other control signals that control various operations in a transfer. The information signals may constitute data, which is the object or result of processing, or instructions, which indicate to the processor how the data is to be processed.

The bus 14 does not require a one-to-one correspondence between all of the information and control signals required to be transferred and the conductors comprising the bus. In one specific embodiment of this invention, the address signals are multiplexed onto the same conductors that transfer information signals, and also onto other conductors that carry the system control signals. However, the multiplexing requires other conductors that carry control signals to identify the nature of the signals transferred by the conductors at any one time. The decrease in the number of conductors that is permitted by the multiplexing, however, more than makes up for the increase in conductors required to identify the nature of the signals multiplexed onto a conductor.

2. Central Processor Unit 10

Figure 2:
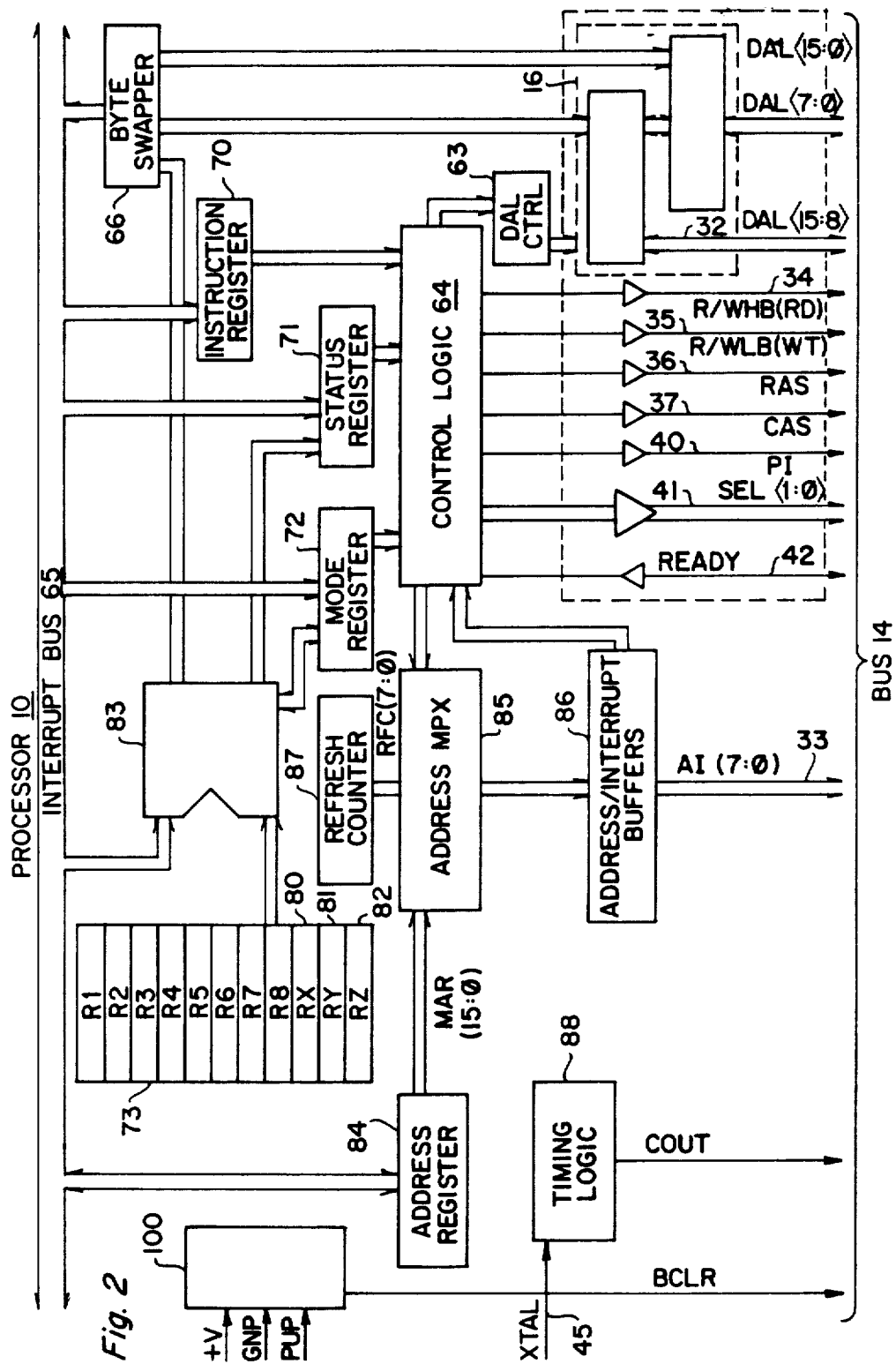
FIG. 2 is a block diagram of a central processing unit according to this invention, and further detailing signal transfer lines and corresponding signals that constitute a system bus shown in FIG. 1.

FIG. 2 is a block diagram illustrating a processor 10 according to the invention, and the connections between the processor's bus interface 16 and bus 14.

Bus 14 includes a number of conductors for transferring information and control signals between processor 10 and the remainder of the data processing system shown in FIG. 1, including:

Data/address lines DAL (15:0) 30, which at various times carry information signals and address signals. The data address lines DAL (15:0) are divided into an upper byte, DAL (15:8) 31, and a lower byte (7:0) 32.

Address/interrupt lines AI (7:0) 33 at various times carry address signals and at other times carry system control signals including interrupt request signals and bus request signals transmitted by elements other than processor 10. The interrupt request signals received from the address/interrupt lines AI (7:0) includes such interrupt request signals as HALT and PF (power fail) from address/interrupt lines AI (7:6), and encoded interrupt request signals from address interrupt lines AI (5:1), which carry a VEC vector control signal and control priority signals CP (3:0). A bus request signal, received from address/interrupt line AI (0) is asserted by an element desiring to initiate a transfer over bus 14. The processor 10 may also use address/interrupt lines AI (7:0) to transmit address information in connection with transfer operations performed with certain memories, as explained below, and also may use the address/interrupt lines AI (7:0) in connection with refreshing operations.

A R/WHB (read/write high byte) line 34 and R/WLB (read/write low byte) line 35 carry read/write control signals transmitted by processor 10 to indicate the direction of an information transfer over the data address lines 30. A "read" transfer refers to a transfer of information from a memory location to the processor; a "write" transfer refers to a transfer of information from the processor.

A row address signal (RAS) line 36, a column address signal (CAS) line 37, and priority-in (PI) line 40 carry respective RAS row address, CAS column address and PI priority in bus control signals that are transmitted by processor 10. The leading edge of the RAS row address signal indicates that address signals coupled by the processor 10 onto the respective data address lines DAL (15:0) 30 have stabilized and may be latched and decoded.

As discussed below with respect to FIGS. 6 through 14 and 26, in certain instances the processor 10 also couples certain address and control signals onto the address/interrupt lines AI (7:0). The leading edge of the RAS row address signal indicates that the signals have stabilized on the address/interrupt lines AI (7:0) and that they may be latched and decoded. The address signals that are coupled onto the address interrupt lines AI (7:0) at the leading edge of the RAS row address signal are referred to herein as the row address.

The CAS column address signal, when asserted, indicates that the processor, when coupling address and control signals onto address/information lines AI (7:0) has coupled the second portion of address and control signals onto those lines. The address signals are referred to as the column address. The leading edge of the CAS column address signal indicates that the column address and any simultaneously-transferred control signals have stabilized on the address/interrupt lines AI (7:0) and that they may be latched and decoded.

The PI priority in signal serves several functions. First, the PI priority in signal indicates to memory elements 11 and input/output elements 12 that they may couple information signals onto the data address lines. Second, the PI priority in signal indicates that bus request or interrupt request signals can be coupled onto the address interrupt lines AI (7:0). Third, the PI priority in signal indicates that write information signals coupled by the processor 10 onto the data address lines have stabilized and may be strobed. The information signals can be latched either at the trailing edge of the CAS column address signal or the trailing edge of the PI priority in signal. The bus request and interrupt request signals are latched by processor 10 at the trailing edge of the PI priority in signal.

Figures 3, 5:
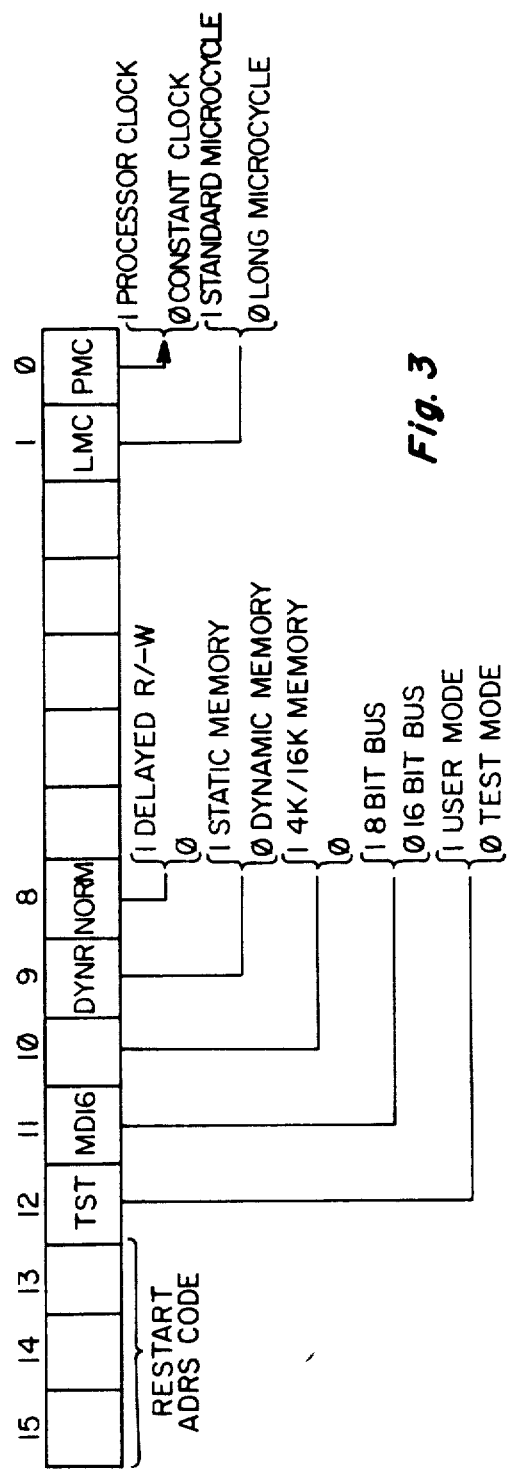
FIG. 3 is a diagram detailing the various stages of the operating mode register shown in FIG. 2.
FIG. 5 is a table identifying the condition of the function select lines of the system bus as determined by the central processor unit shown in FIG. 2, as a function of the nature of an accompanying transfer.

The SEL lines 41 carry transfer function selection signals SEL (1:0) that are encoded as shown in FIG. 5 to identify certain types of transfer operations over the bus 14.

A READY line 42 carries a READY bus control signal which is transmitted by a unit that requires more time than ordinarily provided by the system timing signals to complete a transfer. Pulsing of the READY signal prevents the processor from changing the state of any signal on the bus 14 except a COUT clock out timing signal.

A COUT clock out line 43 carries the COUT clock out timing signal from the processor 10 to permit memory elements 11 and input/output elements 12 to synchronize operations with the processor or to perform other timing operations.

A BCLR line 44 carries a BCLR bus clear signal that initializes or resets the data processing system in response to the system being initially connected to power or following execution by the processor of a reset operation.

In addition to the above connections to bus 14, the processor 10 includes an XTAL connection 45 that connects to a crystal that in turn controls the processor's internal clock timing. A power up connection 46 provides a PUP power up signal when power is initially provided to processor 10.

Having described the external connections to processor 10, the internal structure and signal paths of processor 10 will be briefly described. Signals are received from and transmitted onto data address lines DAL (15:0) 30 by a data address buffer 60. Specifically, the data address buffer 60 comprises a DAL buffer (high byte) 61, which couples signals from and to data address lines DAL (15:8) 32, and a DAL buffer (low byte) 62 which couples signals from and to data address lines DAL (7:0) 31. The data address buffer operates under control of signals from a data address line control 63 in accordance with timing and other control signals from a control logic 64.

Information in data address buffer 60 is transferred through a byte swapper 66 and then to the remainder of processor 10 over an internal bus 65. In one specific embodiment, internal bus 65 includes conductors for transferring a word (two bytes or sixteen bits) at one time. The information from data address buffer 60 may be transferred to an instruction register 70, a status register 71, an operating mode register 72, or a register file 73 that includes eight individually-addressable registers R0–R7. Register R7 (74) in one embodiment is the program counter that identifies the address of the next instruction to be executed, and register R6 (75) may be used as a stack pointer to identify address locations to which contents of various registers are transferred during interrupt operations. The register file 73 also includes three scratch pad registers, namely: an RX register 80, an RY register 81 and an RZ register 82. The contents of any of the registers in register file 73 can be coupled directly to an input arithmetic logic unit 83. Alternatively, the contents of any of the registers of the register file 73 may be coupled to an input of the arithmetic logic unit through internal bus 65. One output of the arithmetic logic unit coupled signals through the byte swapper 66 to internal bus 65, and a second output couples certain status signals to status register 71.

The contents of an address register 84 can also be transferred to data address buffer 60 over internal bus 65. The contents of address register 84 can also be coupled through one input of an address multiplexer 85 and address/interrupt buffers 86 and coupled onto address/interrupt lines AI (7:0) 33. Another input to the address multiplexer 85 also receives signals from a refresh counter 87 that generates a row address for refreshing dynamic memories.

Processor 10 is controlled by a control logic 64 which receives signals from operating mode register 72, status register 71, and instruction register 70, and interrupt and bus request signals from address/interrupt buffers 86 and generates signals that create the required signal paths to enable the performance of the indicated operations.

Status register 71 contains stages that indicate the current operating priority level of processor 10, and stages that contain condition codes containing information regarding operations performed by arithmetic unit 83, including whether certain results were a zero or negative, or whether they generated a carry or an overflow condition. The status register 71 also includes a stage whose condition determines whether certain trap operations must be performed.

With reference to FIG. 3, the operating mode register 72 includes a number of stages that are set or cleared to define certain logical operating characteristics of the data processing system in which processor 10 is connected.

Figure 4A:
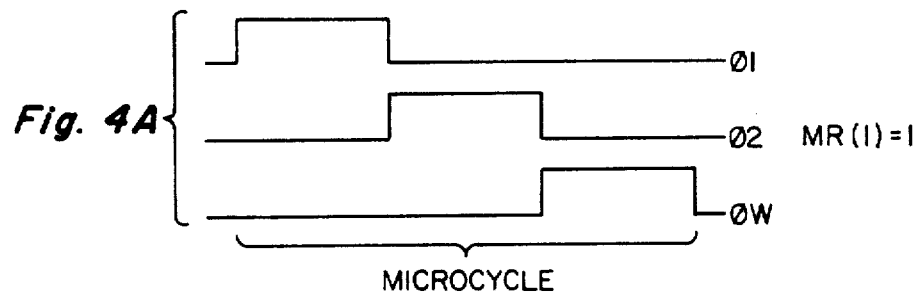
FIGS. 4A and 4B, is a timing diagram detailing timing signals provided by the central processor unit's timing logic shown in block diagram form in FIG. 2, as a function of the condition of mode register stage (1)
Figure 4B:
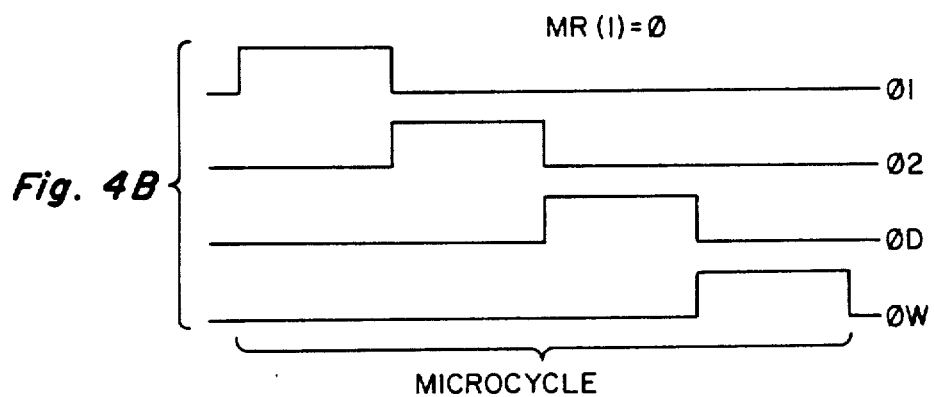

Specifically, operating mode register stages (0) and (1) effect the timing signals that are generated by processor 10 and coupled onto bus 14. Operating operating mode register stage (1) controls the length of a timing cycle (hereinafter referred to as a "microcycle") generated by timing logic 88 (FIG. 2), thereby enabling the connection of the processor 10 in data processing systems requiring timing cycles of different durations. When operating mode register stage (1) is set, processor 10 normally generates a short microcycle having three clock phases as shown in FIG. 4A. A short microcycle comprises three sequential timing signals comprising a phase 1 timing signal, a phase 2 timing signal and a phase W timing signal. When operating mode register stage (1) is cleared, the timing logic normally generates a long microcycle as shown in FIG. 4B, in which a fourth timing signal, a phase D timing signal, is generated following the phase 2 timing signal. The phase W timing signal is generated following the phase D timing signal.

When operating mode register stage (1) is set, the short microcycle generated enables processor 10 to be connected to a relatively fast memory, that is, a memory that can typically respond to transfer requests initiated by processor 10 within the time dictated by the short microcycle. When operating mode register stage (1) is cleared, on the other hand, the long microcycle permits the processor to be connected to a relatively slow memory that may require the extra time provided by the phase D timing signal to complete a transfer. If more time is needed to complete a transfer than is provided by operating mode register stage (1) being in either the set or cleared conditions, the memory can pulse the READY line 42, which provides a longer time than provided by either the short or long microcycle.

Operating mode register stage (0), when set, causes the processor 10 to assert the COUT timing output signal when the timing logic asserts the phase W timing signal. When operating mode register stage (0) is cleared, a free-running timing signal output governed by the XTAL crystal input signal. Operating mode register state (0) thus enables processor 10 to be connected in data processing systems requiring either type of timing signals.

Operating mode register stage (8), when cleared, enables the control logic 64 (FIG. 2) to transmit the read/write control signals R/WHB and R/WLB coincidentally with the transmission of the address on the DAL data address lines 15:0. When the operating mode register stage (8) is set, the R/WHB and R/WLB read/write control signals are delayed and transmitted coincidentally with the column address signal CAS. Operating mode register stage (8) thus enables processor 10 to be connected in data processing systems that require the read/write bus transfer control signals R/WHB and R/WLB at either time during a transfer.

Operating mode register stage (9) is set when the memory element 20 (FIG. 1) is a static memory, and cleared when the memory element is a dynamic memory. When operating mode register stage (9) is cleared, control logic 64 is enabled to initiate refresh operations. When operating mode register stage (9) is cleared, processor 10 also sequentially couples the row address and column address onto the address/interrupt lines AI (7:0). Operating mode register stage (9) thus enables processor 10 to be connected in data processing systems having memory elements requiring the row and column address to be transmitted sequentially, and also in data processing systems having memory elements that require a row address to initiate a refreshing operation.

Operating mode register stage (10) indicates the size of the memory circuits to which processor 10 is connected. Operating mode register stage (10) is set when processor 10 is connected to a memory 11 having a maximum size of 32K addressable storage locations, comprising conventional currently-available 4K or 16K integrated circuit packages. Conversely, operating mode register stage (10) is cleared if the processor is connected to a memory 11 having a maximum 64K addressable storage locations comprising currently-available integrated circuit packages. The state of operating mode register stage (10) also varies the encoding of the SEL function select lines SEL (1:0) 41 as shown in FIG. 5. Operating mode register stage (10) thus enables the processor 10 to be connected in data processing systems having diverse address and control signal requirements.

Operating mode register stage (11) is set when the data bus to which processor 10 is connected has eight conductors for transferring information, that is, an information bus that can transfer one byte of information in parallel. Conversely, operating mode register stage (11) is cleared if the data bus is capable of transferring two bytes (one word) of data in parallel. The condition of operating mode register stage (11) determines the nature of the signals transferred by the processor 10 over the data address lines DAL (15:0) 30, and the address/interrupt lines AI (7:0) 33. Operating mode register stage (11) enables processor 10 to be connected in data processing systems having a data bus capable of carrying diverse amounts of information in parallel.

The setting of operating mode register stage (12) causes processor 10 to operate in a user mode, whereas clearing operating mode register stage 12 causes the processor to operate in a test mode.

Operating mode register stages (15:13) contain encoded start/restart address information. The user may select one of eight initial addresses at which the data processor begins operations following an initial power-up or a restart of operations following a HALT or a PF power fail interrupt.

3. Transfers

Operating mode register stages (11:8) govern certain sequences of signals to tranfer information over bus 14. The various information transfers are described below in connection with FIGS. 6 through 13 and a refresh transfer is described in connection with FIG. 14. In brief, FIGS. 6 through 9 relate to information transfers over an information bus capable of transferring two bytes of information in parallel, and FIGS. 10 through 13 relate to information transfers over an information bus capable of transferring one byte of data in parallel. FIGS. 6, 7, 10 and 11 relate to read and write transfers in which address signals are not transferred over the address/interrupt lines AI (7:0), whereas FIGS. 8, 9, 12 and 13 relate to read and write transfers in which address signals are transferred over the address interrupt lines AI (7:0).

A. Transfers Of Two Information Bytes In Parallel (i) Address/Interrupt Lines Do Not Transfer Address Signals (a) Read Transaction FIGS. 6A–6I collectively depict timing diagrams illustrating signals for performing a read transaction initiated by the processor 10 to retrieve information from, for example, a memory unit 11 (FIG. 1), over an information bus capable of transferring one word of information (two bytes) in parallel and in which the address signals are transmitted over the data address lines DAL (15:0) and not over the address/interrupt lines AI (7:0). This arrangement is typical of a system in which the processor 10 is connected to a static memory.

The read transaction comprises several transfers. During a first transfer, the processor addresses the memory's storage location whose contents are to be transferred by the memory controller. The memory controller then causes the data to be transferred to the processor during a second transfer. For a data processing system having a static memory and a sixteen-conductor information bus, operating mode register stage (11) is cleared and stage (9) is set. The COUT timing signal shown in FIG. 6A is representative of a pulse mode clock (PMC), with operating mode register stage (0) being set.

At the beginning of the transaction, control logic 64 moves the address, which is located in one of registers R0-R7 (73, FIG. 2) or in one of the RX-RZ scratch pad registers 80-82, to address register 84 and to data address buffer 60. The address signals are coupled only onto data address lines DAL (15:0). After the address signals have stabilized on the data address lines DAL (15:0), the control logic 64 energizes, first the row address line 36 (FIG. 2) to assert the RAS row address signal and second the column address line 37 (FIG. 2) to assert the CAS column address signal. The priority in (PI) line 40 is then energized to assert the PI priority in signal.

As exemplified in FIGS. 6G and 6H, the control logic 64 maintains both read/write lines 34 and 45 de-energized during the entire read transaction to indicate a read operation, and the function select lines 41 are variably energized or de-energized to provide SEL function select signals (1:0) having the encoding shown in FIG. 5, depending on the nature of the transfer.

The units connected to bus 14, for example, the memory units 11, respond to the assertion of the PI priority in signal as an indication that the requested information signals should be held stable on the data address lines, and also that interrupt and bus request information should be held stable on the respective lines of address-/interrupt lines AI (7:0). The control logic 64 changes the CAS column address signal to a non-asserted state and simultaneously latches the information signals on data address lines DAL (15:0) in an internal register, for example instruction register 70, operating mode register 72 or a register in register file 72. In this example, the signals on data address lines DAL (15:0) are received in the respective DAL buffer (high byte) 61 and DAL buffer (low byte) 62 and transferred to the respective register. Control logic 64 then enables the interrupt and bus request signals on address/interrupt lines AI (7:0) to be latched in address/interrupt buffers 86 and changes the PI priority in signal to a non-asserted state. The control logic 64 then changes the RAS row address signal to a non-asserted state to complete the transfer.

(b) Write Transaction

FIGS. 7A-7I collectively depict timing diagrams illustrating the signals for performing a write operation with the stages of the operating mode register having the same condition as for the read transfer of FIGS. 6A-6I. The timing diagrams of the signals shown in FIGS. 7A-7F are identical to those shown in FIGS. 6A-6F, with the exception that the processor couples the information to be transferred onto the data address lines DAL (15:0). The control logic 64 maintains the SEL function select signals (1:0) in non-asserted states during the transaction. The control logic 64 asserts the read/write control signals R/WLB and R/WHB shown in FIGS. 7G and 7H to indicate a write operation during the transfer.

The particular time during the transfer at which the read/write control signals are asserted is governed by the condition of operating mode register stage (8) (FIG. 3). If operating mode register stage (8) is cleared, as shown in FIG. 7G, the control logic 64 asserts R/WLB and R/WHB read/write control signals when it couples the address onto the data address lines DAL (15:0), and maintains them at an asserted level until the write information is removed. Alternatively, if operating mode register stage (8) is set as shown in FIG. 7H, the condition of each of the read/write control signals R/WHB and R/WLB changes from a non-asserted state to an asserted state, and then back to a non-asserted state, simultaneously with the corresponding change of the condition of the column address signal CAS.

(ii) Address/Interrupt Transfer Address Signals (a) Read Transaction

FIGS. 8A-8I collectively depict timing diagrams showing a read transfer between the processor 10 and a memory 11 over an information bus capable of transferring one word (two bytes) of information in parallel, and in which the memory requires the address signals to be transferred in the sequence provided by the address-/interrupt lines AI (7:0). This arrangement is typical of data processing systems in which processor 10 is connected to a dynamic memory. In such an arrangement, operating mode register stages (9) and (11) are both cleared.

With reference to FIGS. 8A-8I, the control logic 64 couples the address from the data address buffer 60 onto the data address lines DAL (15:0) 31 (FIG. 2). Simultaneously, control logic 64 couples the row address from address register 84, that is, the contents of address register stages ( . . . 15, 13, 11, . . . , 1), through address multiplexer 85 and address/interrupt buffers 86 (FIG. 2) onto the address/interrupt lines AI (7:0) 33. After a time to permit the address signals to stabilize, the control logic 64 asserts the row address signal RAS. The control logic 64 then removes the row address from the address interrupt lines AI (7:0) and couples the column address, that is, the contents of address register stages ( . . . 14, 12, 10, . . . , 0), from the address register 84, through address multiplexer 85 and address interrupt buffers 86 and onto address/interrupt lines AI (7:0) 33 (FIG. 2). After a time to permit the column address to stabilize on address/interrupt lines AI (7:0) the control logic 64 asserts the CAS column address signal by energizing the column address line 37 (FIG. 2). The control logic also removes the address signals from the data address lines DAL (15:0) in preparation for receiving the read information. A time after the CAS column address signal is asserted, the column address signals are removed from the address/interrupt lines AI (7:0) in preparation for receiving interrupt and bus request information. When the PI priority interrupt signal shown in FIG. 8F is asserted, the processor has removed the column address from the address/interrupt lines AI (7:0) 33. The address/interrupt lines AI (7:0) are available for other units on the bus 14 to transfer interrupt or bus request signals to processor 10. The remainder of the read transaction is identical to the read transaction discussed above with respect to FIGS. 6A-6I.

(b) Write Transaction

FIGS. 9A–9I contain timing diagrams illustrating the signals for performing a write transaction in a data processing system including processor 10, over a sixteen-conductor data bus and to a dynamic memory. The address and control signals in FIGS. 9B–9F are identical to those shown in FIGS. 8B–8F, except that the read/write control signals R/WHB and R/WLB are asserted and de-asserted with timings shown in FIGS. 9G [with operating mode register bit (8) set] and 9H [with operating mode register bit (8) cleared], that is, identical to the read/write control signals shown in FIGS. 7G and 7H. Furthermore, interrupt request signals on address/interrupt lines AI (7:0) are not received by processor 10 during a write transaction.

B. Transfers Of One Information Byte In Parallel

(i) Address/Interrupt Lines Do Not Transfer Address Signals

(a) Read Transaction

FIGS. 10A–10J collectively depict timing diagrams illustrating the signals for performing a read transaction initiated by processor 10 to retrieve information from a memory 11 over an information bus capable of transferring one byte of data in parallel and in which address signals are transmitted over the data address lines DAL (15:0) and not over the address/interrupt lines AI (7:0). This arrangement is typical of a system in which the processor 10 is connected to a static memory. In such an arrangement, operating mode register stages (11) and (9) are both set.

A transfer in the data processing system between processor 10 and a memory element 11 requires a transfer of an entire word, that is, two bytes of information. In such a case, a complete transfer over an information bus capable of transferring only one byte of data in parallel requires the processor to perform two successive one-byte transfers to obtain the entire word of information.

FIGS. 10A–10J depict the two required transfers initiated by processor 10 to retrieve a word (two bytes) of data over the one-byte information bus. During the first transfer, the least significant byte of the word is transferred, and during the second transfer the most significant byte of the word is transferred. Both information bytes are successively transferred over the same data lines, specifically, data address lines DAL (7:0), and processor 10 performs certain operations to properly align them internally after they have both been retrieved.

Specifically, during the first transfer the control logic 64 couples the most significant bits of the address signal onto data address lines DAL (15:8), and the less significant bits of the address signal onto data address lines DAL (7:0). The control logic asserts the RAS row address, CAS column address and PI priority in control signals with the same timing as in a transfer over a two-byte information bus, depicted in FIGS. 6D–6F. The R/WHB read/write control signal is asserted as a read signal RD. The timing of the assertion of the RD read signal depends on the condition of operating mode register stage (8). The control logic removes the less significant address bits from the data address lines DAL (7:0) 31 (FIG. 2) prior to its asserting the CAS column address signal, to permit information to be transferred over the data address lines DAL (7:0). The most significant address bits remain coupled on data address lines DAL (15:8) 32 throughout both transfers of the read transaction. Data address lines DAL (15:8) 32 do not carry data during this transaction. The SEL function select (1:0) signals are enabled during the first transfer as shown in FIG. 10J. The address/interrupt lines AI (7:0) are monitored to receive interrupt and bus request information which is latched when the PI priority in signal changes to a non-asserted state.

The information signals are received in DAL buffer (low byte) 62 (FIG. 2), and is transferred to a scratch pad register, specifically to the least significant byte of the two-byte register.

The processor 10 then initiates a second read transfer to retrieve the upper or most significant byte of the word being retrieved. The processor obtains the address of the most significant byte of the word being retrieved. In one specific embodiment, information is stored in memory in a word-aligned arrangement, in which the least significant bit of the word's address is a "zero". In this arrangement, the word address constitutes the address of the least significant byte of the word. The most significant byte also has an address, which is the address of the least significant byte, incremented by "one". Thus, to obtain the address of the most significant byte, the processor 10 increments by "one" the address that was previously transferred to retrieve the least significant byte. Further, since the least significant bit of the previously-transferred address was a "zero", the processor increments the address by setting the least significant bit of the address to obtain the new address.

Both the upper and lower bytes of the address are transferred over the respective data address lines as in the first transaction, with the data address lines DAL (15:8) 31 still carrying the most significant byte of the address, and the data address lines DAL (7:0) 32 carrying the least significant byte of the address, including the "set" least significant address bit. The RAS row address, CAS column address, PI priority in, and R/WHB read/write high byte control signals are asserted and de-asserted as in the prior transfer. The SEL function select (1:0) signals are not enabled during the second transfer. The address/interrupt AI (7:0) lines are monitored to receive any interrupt and bus request signals, which are latched at when the PI priority in signal changes to a non-asserted state.

When the most significant byte of the information word is received by processor 10, the byte swapper 66 transfers it to the most significant lines of internal bus 65, and transfers it to the most significant byte of the scratch pad register to which the least significant byte of the information word had previously been transferred. The two information bytes are thus properly arranged in the appropriate register.

(b) Write Transaction

FIGS. 11A–11J collectively depict timing diagrams illustrating a write transaction from processor 10 to a static memory over an information bus capable of transferring one byte of information in parallel. The signals are identical to those for a read operation, except that the R/WHB read/write control signal is not asserted, and the address/interrupt buffers 86 only latch bus request signals, and not interrupt request signals. The R/WLB read/write control line 35 is asserted as a write control signal WT. The timing of the WT write control signal shown in FIGS. 11H and 11I is governed by the condition of operating mode register stage (8), and corresponds to the timing of the RD read signal in FIGS. 10H and 10I.

(ii) Address/Interrupt Lines Transfer Address Signals

FIGS. 12A-12J and 13A-13J collectively depict timing diagrams illustrating read and write transfer operations, respectively initiated by processor 10, when operating operating mode register stage (11) is set and stage (9) is cleared. Operating mode register stages (9) and (11) are so conditioned when the processor 10 is connected in a data processing system having a memory that requires address signals in a sequence provided by the address/interrupt lines AI (7:0) and the information bus transfers one byte of information in parallel. In performing such transfers, as in transfers shown in FIGS. 10A-10I and 11A-11I, two one-byte information transfers are required to transfer an entire word of information. Address and information signals are transferred over data/address lines DAL (15:0), as shown in FIGS. 12B, 12C, 13B and 13C, in the same manner as in FIGS. 10B, 10C, 11B and 11C. For each byte transfer, however, row and column address information is coupled onto the address/interrupt lines AI (7:0) as in transfers to a dynamic memory over an information bus that transfers two bytes of information in parallel, as shown in FIGS. 8C and 9C. The RAS row address, CAS column address, PI priority in, RD read and WT write control signals are all asserted and then changed to non-asserted states as shown in FIGS. 10E-10I and 11E-11I.

C. Refresh Operations

If operating mode register stage (9) is set, processor 10 does not perform refresh transfers to initiate refresh operations in memory 11. However if operating mode register stage (9) is cleared, processor 10 performs refresh transfers to initiate refresh operations. FIGS. 14A-14E contain timing diagrams illustrating a refresh transfer over bus 14. Control logic 64 couples a refresh address from refresh counter 87 through address multiplexer 65 and address/interrupt buffers 86 onto address/interrupt lines AI (7:0) 33 (FIG. 2). The RAS row address signal is then asserted. The SEL function select lines (1:0) are encoded with the refresh coding shown in FIG. 5. After each refresh transfer, the contents of refresh counter 87 are incremented in preparation for a subsequent refresh transfer.

4. Operating mode Register

The loading and the interaction of the various stages of operating mode register 72 with various circuits of processor 10 in one specific embodiment of the invention will now be described.

The operating mode register 72 is loaded when the processor 10 is initially powered up and when it executes a reset instruction. The operating mode register includes stages that identify certain logical characteristics of the data processing system in which processor 10 is operating. The signals that are loaded into the operating mode register are not changed unless the logical characteristics of the data processing system are changed. The operating mode register loading arrangements can thus be wired in the data processing system. One arrangement for generating signals and loading the operating mode register is shown in FIG. 15.

Figure 15:
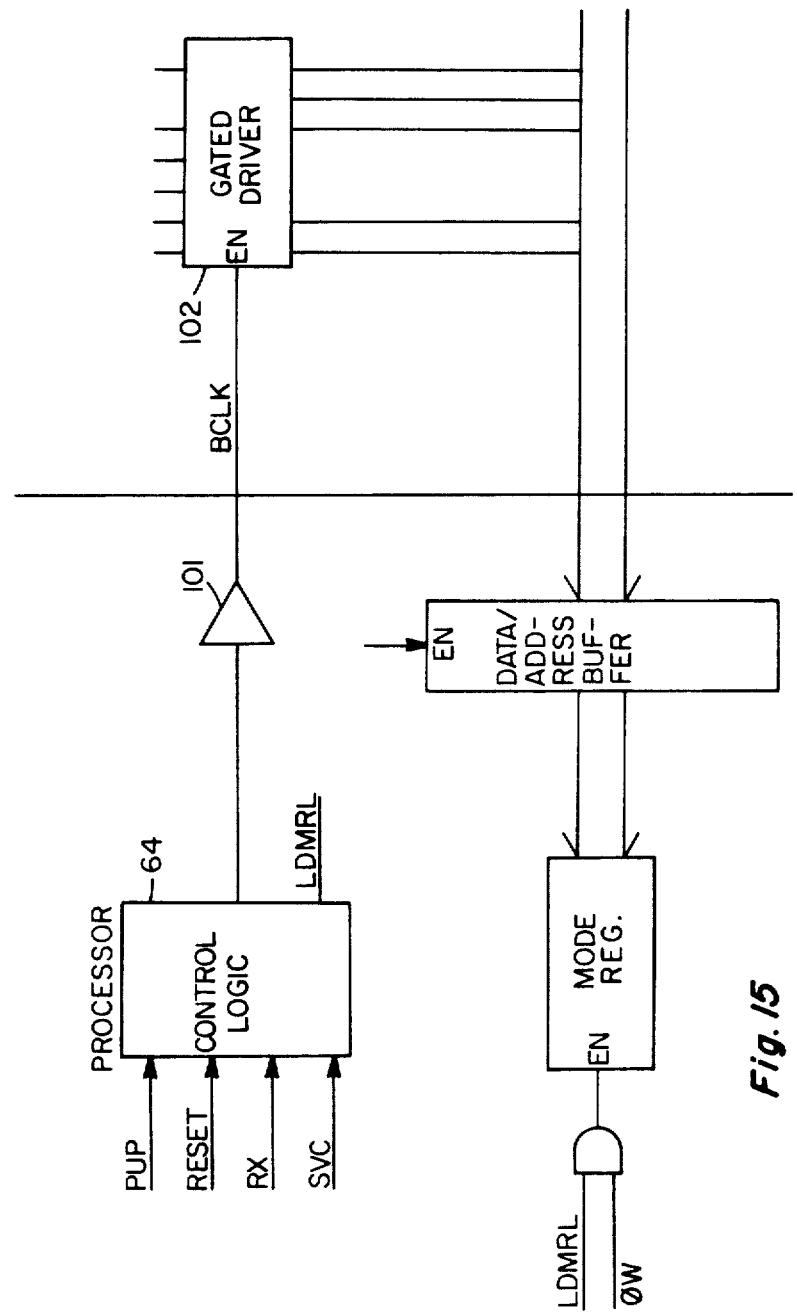
FIG. 15 is a schematic diagram showing a portion of the circuitry in the central processing unit for loading the mode register shown in FIG. 3.

With reference to FIG. 15, in response to the assertion of a power up PUP signal or the receipt of a RESET signal asserted during execution of a reset instruction, control logic 64 asserts an IBCLR internal bus clear signal, which is coupled through a driver 101 as a BCLR bus clear signal. The BCLR bus clear signal enables a gated driver 102 to energize selected lines of the data address lines DAL (15:0) corresponding to stages of the operating mode register to be set. The signals are received by the data address buffer 60 and transferred to the operating mode register in response to the coincidence of the assertion of an LDMRL load operating mode register signal and the phase W timing signal.

Figure 16:
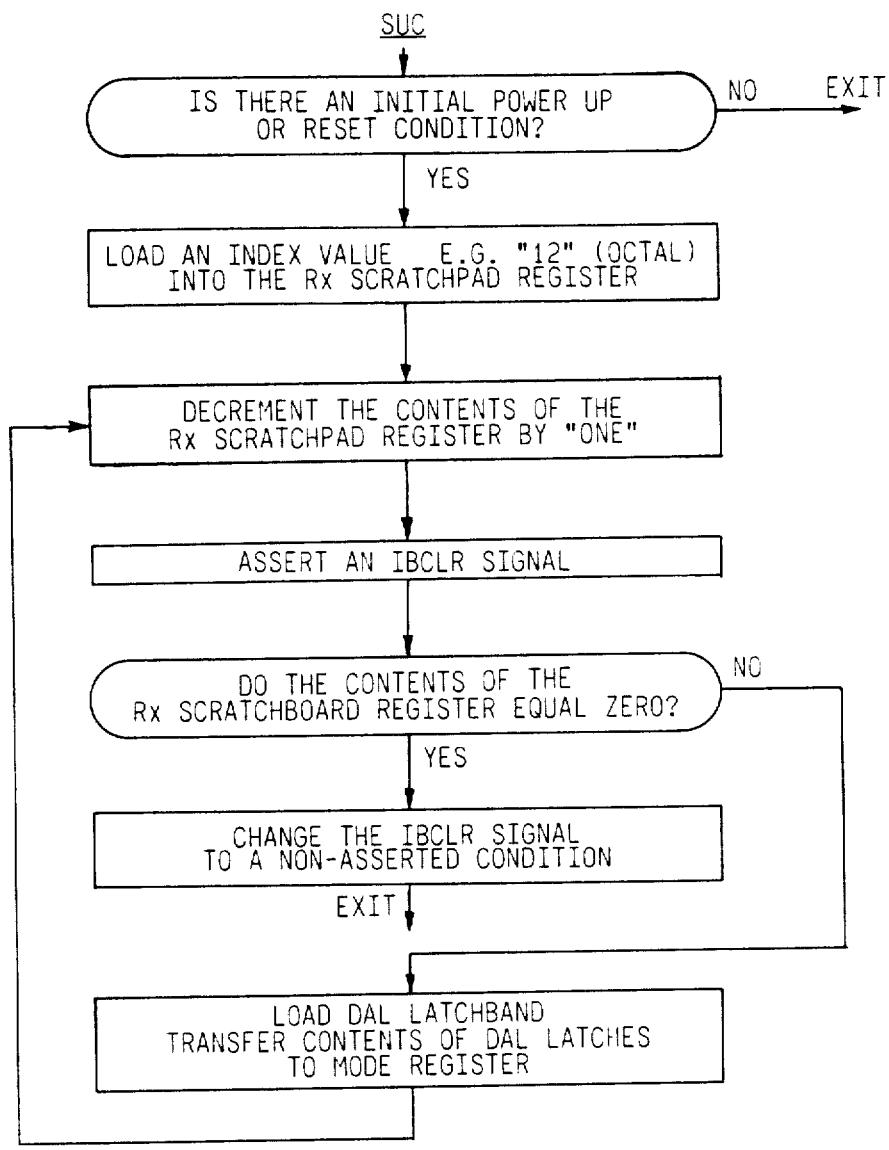
FIG. 16 is a flow diagram detailing the sequence of steps performed by the central processor unit to effect a loading of the mode register shown in FIG. 3, utilizing the circuitry shown in FIG. 15.

The sequence for loading the operating mode register is depicted in a flow diagram contained in FIG. 16. If the PUP power up signal is asserted or if a RESET command is received (step 110), an index number "12" (octal) is loaded into the RX scratch pad register 80 (step 112). The contents of the RX register 80 are then decremented by one (step 114), and the IBCLR signal is asserted thereby asserting of the BCLR signal through driver 101 (step 115). The contents of the RX register 80 are tested (step 116) and if they equal zero, the IBCLR signal is de-asserted (step 117) and the sequence ends (step 118). If in step 116 the contents of the RX scratch pad register 80 do not equal zero, the signals on the data address lines DAL (15:0) are received by the data address buffer 60 (step 120) and transferred over internal bus 65 to the operating mode register 72. The routine then returns to step 114, where the contents of the RX register 80 are decremented by one. The routine continues until the contents of the RX register 80 equal zero, at which time the operating mode register loading sequence ends.

Figure 17:
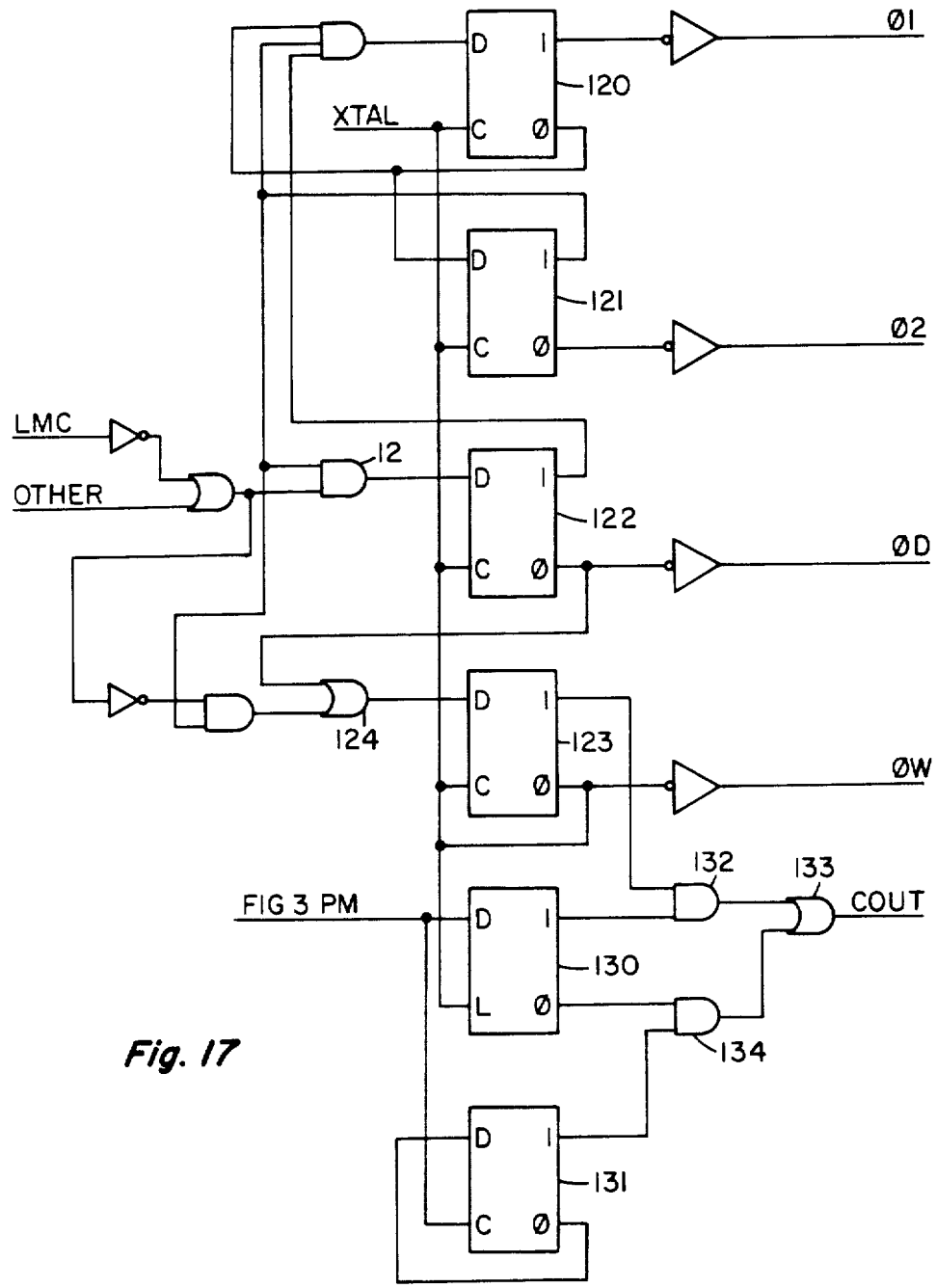
FIG. 17 is a schematic diagram detailing circuitry in the timing logic shown in FIG. 2.

FIG. 17 illustrates in one specific embodiment the interconnection between two stages of operating mode register 72 and certain circuits in processor 10 (FIG. 2). FIG. 17 is a schematic diagram showing circuitry in timing logic 88 (FIG. 2) for generating either the short microcycle sequence of timing signals shown in FIG. 4A, or the long microcycle sequence of timing signals shown in FIG. 4B, in response to the condition of the operating mode register stage (1). FIG. 17 also depicts circuitry for generating the COUT clock output signal in response to the condition of operating mode register stage (0).

Specifically, when operating mode register stage (1) is set, an LMC long microcycle signal is asserted, and the circuit depicted in FIG. 17 generates the short microcycle comprising the phase 1, phase 2 and phase W timing signals. The phase D timing signal is not generated if the LMC long mode cycle signal is asserted. However, if the operating mode register stage (1) is cleared, the LMC long microcycle signal is not asserted, and the circuit depicted in FIG. 17 does generate the phase D timing signal after the phase 2 timing signal and before the phase W timing signal. In one specific embodiment of the invention, all phase timing signals are of equal length, governed by the frequency of a crystal timing signal XTAL obtained from outside processor 10. Thus, a long microcycle generated when operating mode register stage (1) is cleared is one-third longer than a corresponding short microcycle generated when operating mode register stage (1) is set, as shown in FIGS. 4A and B.

Similarly, when operating mode register stage (0) is set, a PMC pulse mode clock signal is asserted that couples a timing signal representative of the phase W timing signal as the COUT clock out timing signal. If the operating mode register stage (0) is cleared, the PMC pulse mode clock signal is not asserted and a timing signal representative of the XTAL crystal timing signal is coupled as the COUT clock out timing signal.

With specific reference to the circuit depicted in FIG. 17, four flip-flops 120–123 are connected generate the phase 1, phase 2, phase D and phase W timing signals, respectively. If the operating mode register stage (1) is set, the LMC signal is asserted through OR gate 128. An AND gate 124 then couples a conditioning signal from the phase 2 timing signal flip-flop 121 through an OR gate 125 which conditions flip-flop 123 to be reset when the XTAL crystal timing signal is next asserted. The conditioning signal is asserted when the phase 2 timing signal is asserted. The phase W timing signal is thereby asserted immediately after the phase 2 timing signal, resulting in the short microcycle shown in FIG. 4A.

Conversely, if the operating mode register stage (1) is cleared, the complement of the non-asserted LMC long microcycle signal enables an AND gate 126 to couple the conditioning signal from the phase 2 timing signal flip-flop 121 to the input of flip-flop 122. The conditioning signal conditions flip-flop 122 to be set at the assertion of the next XTAL crystal timing signal which asserts the phase D timing signal. OR gate 125 then couples a conditioning signal from the phase D timing signal flip-flop 122 to reset flip-flop 123 at the assertion of the next XTAL crystal timing signal and thereby enable the assertion of the phase W timing signal.

The nature of the COUT clock out timing signal, that is, whether it is representative of the phase W timing signal or the XTAL crystal timing signal, is determined by a DL flip-flop 131. The condition of operating mode register stage (0) governs the condition of DL flip-flop 131. If operating mode register stage (0) is set, a PMC pulse mode clock signal is asserted that conditions flip-flop 131 to a set condition when the phase W clocking signal is asserted. When DL flip-flop 131 is set, an AND gate 132 is enabled to couple the phase W timing signal from flip-flop 123 through an OR gate 133 as the COUT clock out timing signal. Conversely, if the operating mode register stage (0) is cleared and the PMC pulse mode clock signal is not asserted, or when the phase W clocking signal is not asserted, the DL flip-flop 131 is conditioned to be reset. When flip-flop 131 is cleared, an AND gate 134 couples the signal from a flip-flop 130, which is continually toggled by the XTAL crystal timing signal through OR gate 133 as the COUT clock out timing signal.

Figure 18:
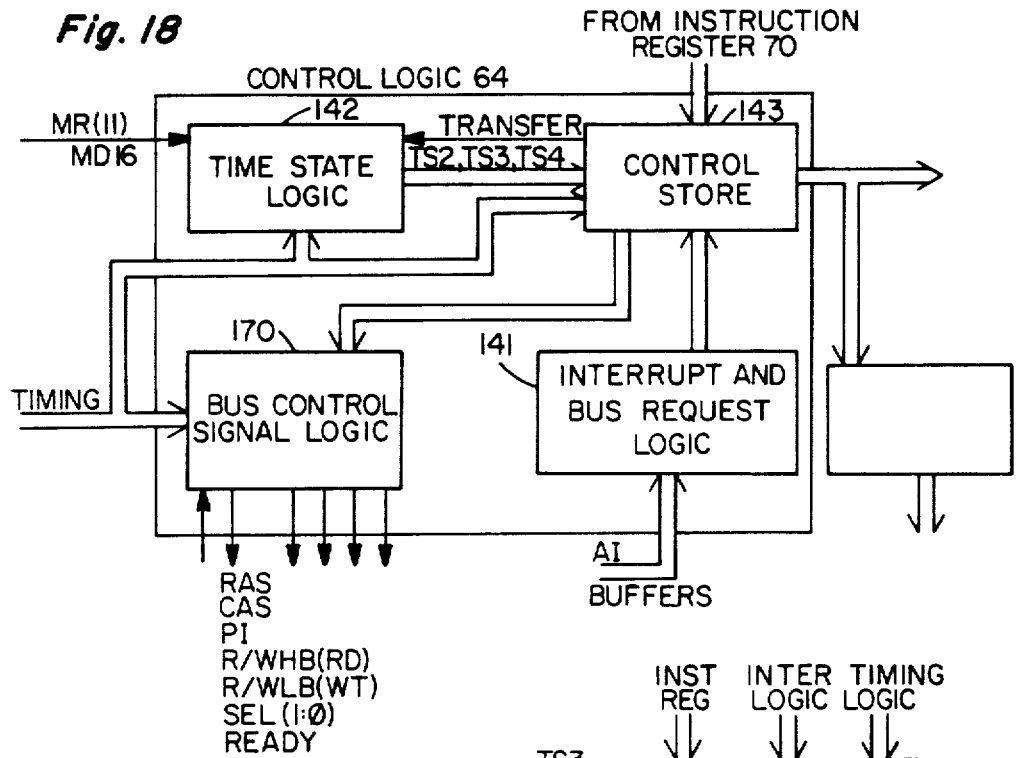
FIG. 18 is a block diagram showing circuitry in control logic in the central processor unit shown in FIG. 2.

FIG. 18 exemplifies, in block diagram form, a control logic 64 including a control store 140 for creating data paths for performing operations as indicated by signals from instruction register 70 (FIG. 1), from an interrupt and bus request logic 141, and a time state logic 142.

Figure 19:
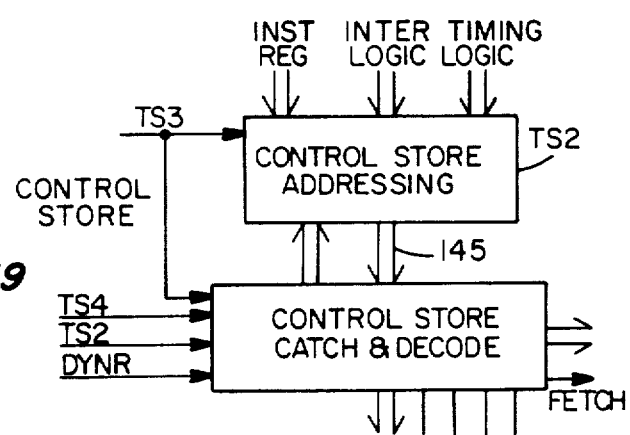
FIG. 19 is a block diagram further detailing circuitry in the control logic.

One specific embodiment of a control store 140 includes an addressing portion 143 and a decode and latch portion 144 (FIG. 19). The addressing portion receives signals from the instruction register 70 and the interrupt and bus request logic 141, timing logic and time state logic 142, and controls control store decode and latch 144 in a known manner to generate control signals to enable processor 10 to perform each operation.

Figure 20:
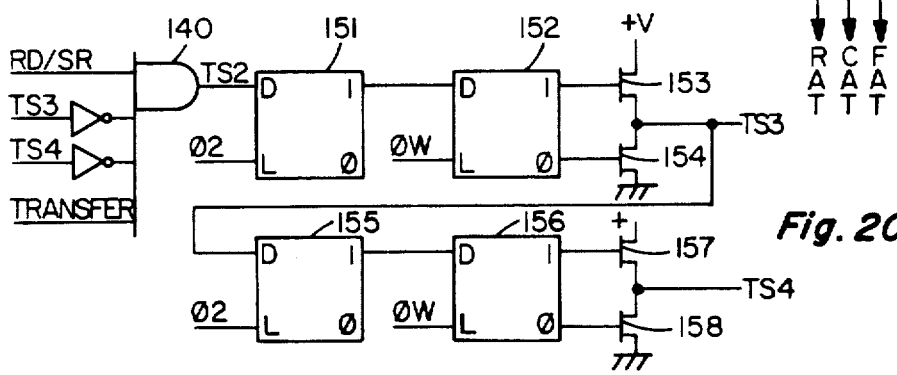
FIG. 20 is a schematic diagram detailing circuitry in the time state logic shown in FIG. 18.

The time state logic 142, a circuit for which is depicted in FIG. 20, generates signals TS2, TS3, and TS4 that enable the processor 10 to perform a second transfer operation if operating mode register stage (11) is set, that is, when processor 10 is connected to an information bus that transfers one byte of information in parallel. The TS2 and TS3 time state signals are coupled to the control store addressing 143 and when asserted prevent the addressing of the control store decode and latch 144 from changing. That is, the TS2 and TS3 time state signals prevent control signals coupled from control store addressing to control store latch and decode 143 along control lines 145 from changing.

With reference to FIG. 20, if operating mode register stage (11) is set, and if a transfer operation has been initiated over bus 14, and if time state signals TS3 and TS4 are not asserted, an AND gate 150 asserts a TS2 time state signal. The TS2 time state signal conditions a flip-flop 151 to be set at the next assertion of the phase 2 timing signal, which in turn conditions a flip-flop 152 to be set by the subsequent phase W timing signal. The setting of flip-flop 152 turns a transistor 153 on and a transistor 154 off, thereby asserting the TS3 time state signal.

The TS3 time state signal is coupled to the control store address logic 143 (FIG. 19), to inhibit it from changing the control signals on control lines 145, and also conditions the control store decode and latch 144 to initiate a second address transfer to begin a second transaction over bus 14. As shown in FIG. 21, the TS3 time state signal also sets the least significant address bit in address register 84 to provide the address of the most significant byte of the information word which is transferred during the second information bit. The control store latch and decode 144, under control of the TS3 time state signal, also initiates the information transfer over bus 14 following the address transfer.

The TS3 time state signal also conditions flip-flop 155 to enable the assertion of the TS4 time state signal by flip-flop 156 and transistors 157 and 158, in the same manner as the TS3 time state signal was asserted by flip-flop 152 and transistors 153 and 154. If the operation is a read operation, the TS4 time state signal conditions the DAL buffer low byte 62 to receive the byte of information and conditions byte swapper 66 to transfer it to the most significant byte of the scratch-pad register to which the first information byte was stored. In the case of a write operation, the TS4 time state signal enables the byte swapper 66 to transfer the information signals from the most significant byte of a selected register through DAL buffer low byte 62 onto the data address lines DAL (15:0).

FIG. 22 exemplifies circuitry for utilizing operating mode register stages (10) and (9). Specifically, operating mode register stage (10) selects either an address signal or a FETCH signal to be transferred over address/interrupt line AI(0) during certain transactions. Operating mode register stage (10) also effects the encoding of the function select line SEL (0) 41 as shown in FIG. 5.

Specifically, the operating mode register stage (10) when set, causes the SEL (0) function select signal to be asserted only during a refresh transfer. If operating mode register stage (10) is cleared, the SEL (0) function select signal is asserted only during an instruction fetch operation, that is, during a read transaction in which the transferred information is an instruction.

With respect to the signal transferred over address-/interrupt line AI(0), if operating mode register stage (10) is set, an MD64R signal is asserted that sequentially couples the two most significant address bits (address bits 15 and 14) onto address/interrupt line AI(0). If operating mode register state (10) is cleared, the MD64R signal is not asserted, and a FETCH signal and the one most significant address bit (address bit 14) are sequentially coupled onto the address/interrupt line AI(0) by address multiplexer 85.

With respect to the effect of operating mode register stage (10) on the SEL function select signals, if the operating mode register stage (10) is cleared, the non-assertion of the MD64R signal conditions SEL(0) function select signal to be asserted when a FETCH signal is asserted. Contrariwise, if operating mode register stage (10) is set, the assertion of the MD64R signal conditions the SEL (0) function select signal to be asserted if an ALREF refresh operation signal is asserted by the control store decode and latch 144 (FIG. 19) to initiate a refresh operation.

Operating mode register stage (9), when cleared, enables the control store 140 (FIG. 18) to initiate a refresh operation and assert the ALREF signal in response thereto. The assertion of the ALREF signal enables the address multiplexer 85 to couple the refresh address form refresh counter 87 onto the address/interrupt lines AI(7:0), and enables the assertion of the SEL (0) function select signal unless operating mode register stage (10) is cleared.

Each bus control signal is related to at least one of the phase 1, phase 2 or phase W timing signals. Some bus control signals are asserted simultaneously with the assertion of a phase timing signal. For example, the RAS row address signal is asserted simultaneously with the phase W timing signal. Other bus control signals are asserted at predetermined times after particular timing signals are asserted. For example, the CAS column address signal is asserted subsequent to the assertion of the phase 1 timing signal and before the assertion of the phase 2 timing signal. Still other bus control signals may be asserted either simultaneously with the assertion of a particular timing signal or a predetermined time after the assertion of a particular timing signal. Examples of the last bus control signals are the R/WHB and R/WLB signals, which are asserted simultaneously with the assertion of the phase 2 timing signal if stage (8) of the operating mode register 72 (FIG. 3) is cleared, or a predetermined time after the assertion of the phase 1 timing signal if stage (8) of the operating mode register is set.

Figure 23:
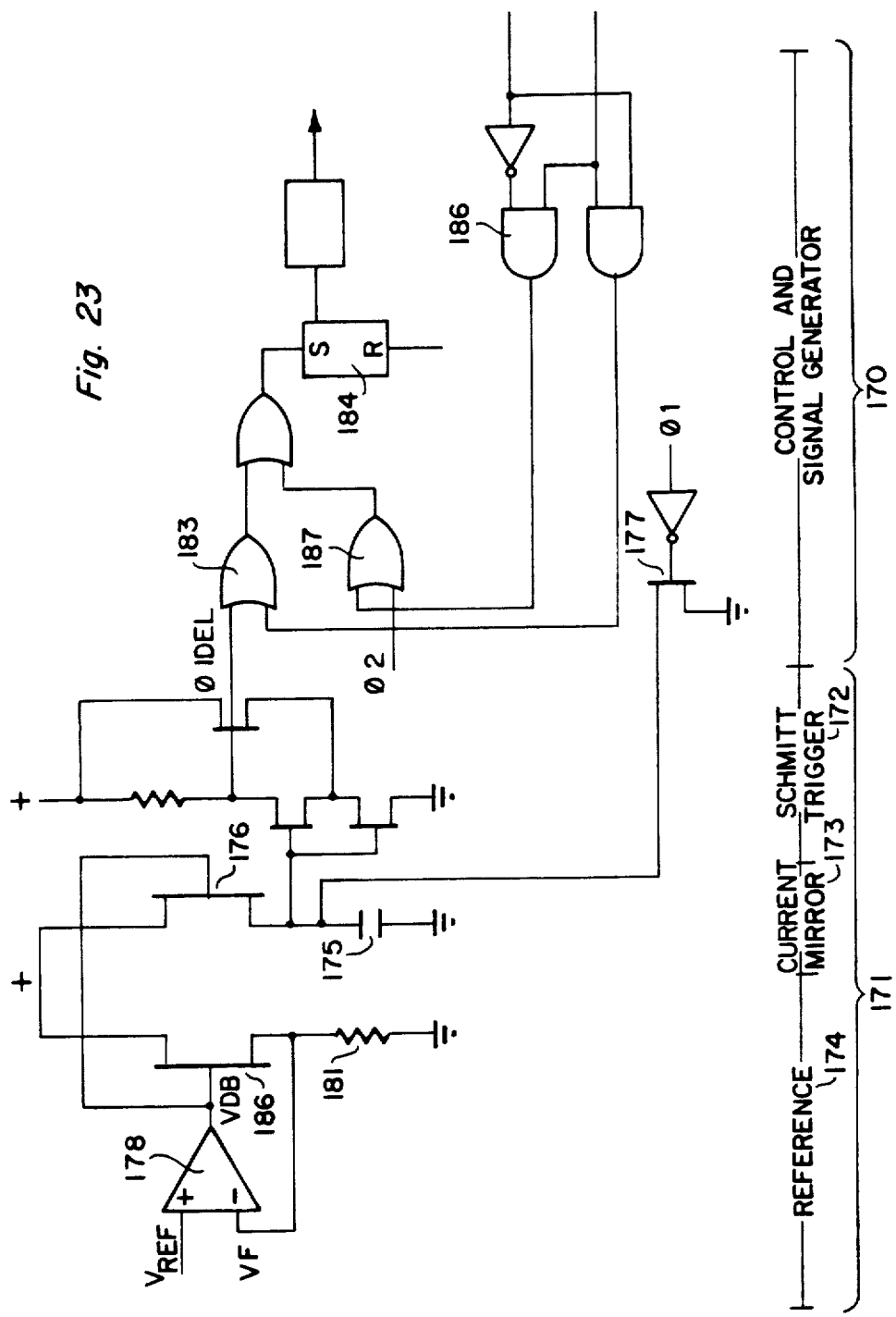
FIG. 23 is a schematic diagram detailing a portion of circuitry in the bus interface of the central processor unit shown in FIG. 2.

FIG. 23 depicts circuitry for enabling the assertion of the R/WHB signal including a control and signal generation portion 170 and a timing signal delay portion 171. The timing signal delay portion asserts a phase 1 DEL delayed timing signal in response to the assertion of the phase 1 timing signal.

The timing signal delay portion 171 includes a threshold trigger portion 172 controlled by a current mirror portion 173. The current mirror portion is controlled in turn by a reference portion 174 that regulates the current flow in the current mirror portion 173. The threshold trigger portion 172, which is a Schmitt trigger in one specific embodiment, can be triggered to assert the phase 1 DEL timing signal when the charge on a capacitor 175 in current mirror 173 reaches a predetermined amount. The capacitor 175 is charged by current from a voltage source regulated by a transistor 176 in current mirror portion 173. The capacitor is discharged through a transistor 177 in control and signal generation portion 170. Transistor 177 is controlled, in turn, by the complement of the phase 1 timing signal. When the phase 1 timing signal is not asserted, the transistor 177 is turned on, which permits the capacitor to discharge. When the phase 1 timing signal is asserted, however, transistor 177 is turned off, which permits the current flowing through transistor 176 to charge the capacitor and trigger the Schmitt trigger to assert the phase 1 DEL delayed timing signal when the voltage level on the capacitor reaches its triggering voltage. Triggering the Schmitt trigger asserts a phase 1 DEL delayed timing signal.

The amount of the current flowing through transistor 176 governs the time that capacitor 175 takes to charge to the Schmitt trigger's threshold level after the phase 1 timing signal is asserted. The current through transistor 176 is governed by the voltage level of a VDB output signal from an operational amplifier 178. The voltage level of the VDB signal is, in turn, controlled by a reference voltage signal V-REF and the complement of a feedback correction signal VF. The VF signal is generated by a feedback circuit comprising transistor 180 and a resistor 181, specifically the voltage at the junction between the transistor 180 and resistor 181.

The current flowing through transistor 180 is also controlled by the VDB signal from amplifier 178. If the voltage of the VDB signal falls below its selected level, the current through transistor 180 decreases. The voltage level of the VF feedback correction signal decreases, and thus the voltage level of the VDB signal increases again. Contrariwise, if the voltage of the VDB signal rises above its selected level, the current through transistor 180 increases, the voltage level of the VF correction signal increases, and the level of the VDB signal decreases.

With reference again to the control and signal generation portion 170 of the circuit depicted in FIG. 23, if operating mode register stage (8) is set, indicating the R/WHB read/write control signal is to be transmitted on a delayed basis (as shown in FIG. 6H) a NORM signal is asserted. When an R/WHB EN enabling control signal is asserted by bus control signal logic 170 (FIG. 18), an AND gate 182 enables a second AND gate 183 to set a latch 184 when the phase 1 DEL signal is asserted by the Schmitt trigger. The setting of latch 189 enables a driver 185 to assert the R/WHB read/write control signal until a DIS disabling signal is received. Thus, latch 184 facilitates the maintenance of the R/WHB read/write control signal at an asserted level after the phase 1 DEL delayed timing signal is shifted to a non-asserted state.

If the operating mode register stage (8) is not set, indicating the R/WHB read/write control signal is to be asserted simultaneously with the phase 2 timing signal (as shown in FIG. 6G), the NORM signal is not asserted. The R/WHB EN enabling signal is coupled through an AND gate 186 to enable AND gate 187 when the phase 2 timing signal is asserted, which, in turn, sets latch 184 to enable driver 185 to assert the R/WHB read/write control signal.

5. Interrupts

If, during a read transfer, any of the address/interrupt lines AI (7:1) are energized at the time the address/interrupt AI buffer 86 are loaded, an interrupt request is received by processor 10, an interrupt request condition results that indicates that a condition exists in the data processing system external to processor 10 that requires attention by processor 10. The time that processor 10 responds to an interrupt request depends on the priority of the request. If address/interrupt lines AI (6:7) are energized, the interrupt is a HALT or PF power fail interrupt having the highest priorities. If address/interrupt lines AI (4:1) are energized, an interrupt request signal is received that has an interrupt priority that depends on the conditions of address/interrupt lines AI (4:1). These lines couple coded priority signals CP (3:0) to interrupt and bus request logic 141.

Figures 24, 25:
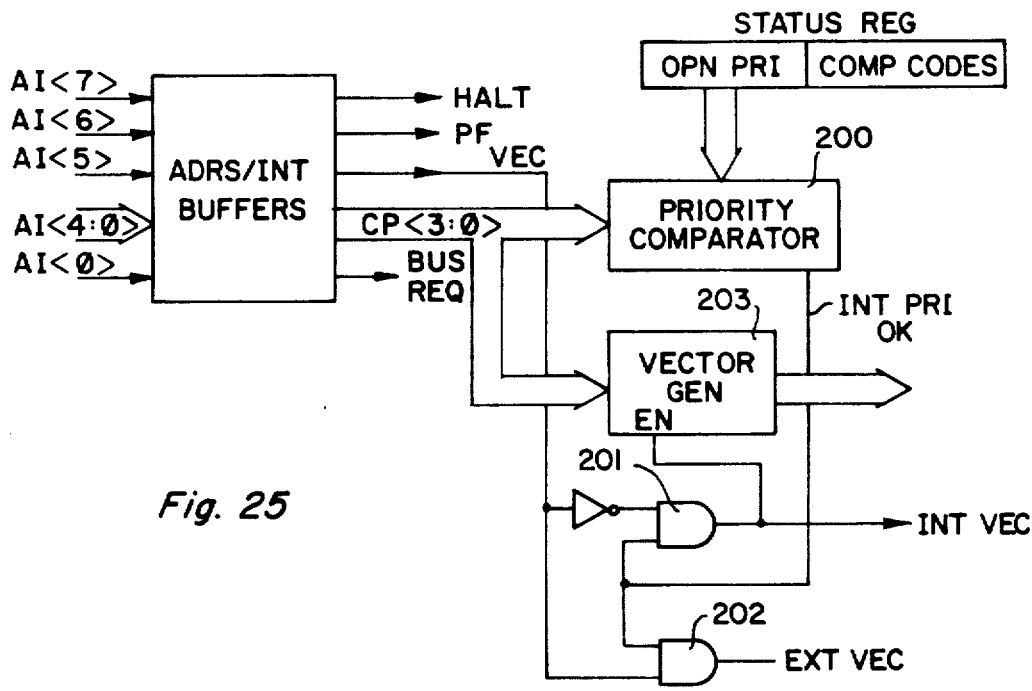
FIG. 24 is a table detailing the relative interrupt priorities of the various coded interrupt priority signals that may be received by the central processing unit shown in FIG. 2.
FIG. 25 is a schematic diagram detailing circuitry in the control logic shown in FIG. 18.

The encoding of the coded priority signals CP (3:0) identify one of fifteen interrupt priority levels, shown in FIG. 24, which in turn correspond to four processor operating priority levels. The processor 10 maintains an internal operating priority level in the status register 71 (FIG. 2). If an interrupt priority level exceeds the processor's current operating priority level, the processor acknowledges the interrupt having the highest priority and executes an interrupt service routine to service the interrupt.

The interrupt service routines are programs that are located in memory beginning at an address that is called the interrupt vector. In one specific embodiment, the interrupt vector may be determined by the processor by the coding of the coded priority CP (3:0) signals, or it may be obtained from the interrupting unit during an IACK interrupt acknowledge transaction. The determination of whether the processor is to generate the interrupt vector internally or receive it during an IACK interrupt acknowledge transaction is governed by the condition of the address/interrupt line AI (5) when the corresponding coded priority CP (3:0) signals are latched. If the address/interrupt line AI (5) is energized, a VEC vector signal is asserted and the processor is to receive interrupt vector during the IACK transaction. If the address/interrupt line AI (5) is not energized, the VEC vector signal is not asserted, and the processor is to determine interrupt vector internally by decoding the coded priority CP (3:0) signals. The processor 10 performs an IACK transaction even if it is to determine the interrupt vector internally.

With reference to FIG. 25, the signals from the address/interrupt lines AI (4:1) are received in address/interrupt buffers 86 and coupled as coded priority CP (3:0) signals to a priority comparator 200 in control logic 64. The operating priority of processor 10 that is contained in status register 71 is also coupled to priority comparator 200. If the interrupt has a higher priority than the operating priority, an INT PRI OK interrupt priority signal is asserted which couples the complement of the VEC vector signal from address/interrupt line AI (5) through an AND gate 201 as an INTVEC internal vector signal. If the VEC signal is asserted when the INT PRI OK interrupt priority signal is asserted, an EXTVEC external vector signal is asserted by AND gate 202. If the INTVEC internal vector signal is asserted, a vector generator 203 is enabled to generate an interrupt vector in response to the coded priority CP (3:0) signals.

If either the INTVEC internal vector signal or EXTVEC external vector signal is asserted, the control logic 64 initiates an IACK interrupt acknowledge transaction on the bus 14. A timing diagram depicting the IACK interrupt acknowledge transaction is set forth in FIG. 26. The processor 10 first couples the interrupt request information that it received from the address interrupt lines AI (5:1) onto the data address lines DAL (12:8) as interrupt acknowledge signals, specifically coupling the coded priority signals CP (3:0) onto DAL lines (11:8), and the VEC vector signal onto data address line DAL (12). Processor 10 also energizes function select line SEL (1) to indicate an IACK interrupt acknowledge transfer (FIG. 5). The function select line SEL (0) is maintained in a de-energized state. The RAS row address signal is then asserted. The units that transferred interrupt request compares the information on data address lines DAL (12:8) to the signals that they previously transferred over the address/interrupt lines AI (5:1) to determine if they had initiated the acknowledged interrupt. If data address line DAL (12) is asserted, the unit that initiated the acknowledged interrupt then couples an interrupt vector onto data address lines DAL (7:2). If the EXTVEC signal is asserted by AND gate 202 (FIG. 25), the processor 10 then latches the interrupt vector signals from data address lines DAL (7:2) into the RY scratch pad register.

FIGS. 27A-27C contain a flow diagrams depicting a portion of a sequence of operations initiated if an interrupt request is received having a sufficient priority to initiate an interrupt.

With reference to FIG. 27A, if address/interrupt line AI (7) is energized, indicating the assertion of a HALT signal (step 201), an index number "1" is loaded into scratch pad register RZ (80, FIG. 2) (step 202), and the sequence proceeds to an MTRAP sequence shown in FIGS. 27B and 27C.

If the address/interrupt line AI (7) is not energized, the condition of the PF power fail signal carried by address/interrupt line AI (6) is determined. If the PF power fail signal is asserted (step 203) an address "24" is loaded into the RY scratch pad register 81 (step 204), and the sequence steps to the MTRAP sequence.

If neither the HALT nor the PF power fail signals are asserted, the sequence examines the state of the EXTVEC external vector signal (step 205). If the EXTVEC signal is asserted, indicating that an interrupt has been requested having sufficient priority to require service by the processor, and that the interrupt vector is to be retrieved from the interrupting unit on data address lines DAL (7:2), after the processor performs an IACK interrupt acknowledge transaction over bus 14, the interrupt vector is retrieved bhrough data address buffer 60 and loaded into scratch pad register RY 81 (step 206). Potentially invalid bits are masked off (step 207) by ANDing the contents of RY with "374" (Octal) to insure that the two least significant bits of the vector are zero, and returning the result to register RY. The sequence then proceeds to the MTRAP sequence.

If the EXTVEC external vector signal is not asserted (step 205), the condition of the INTVEC internal vector signal is examined (step 210). If the INTVEC internal vector signal is asserted, the interrupt vector is coupled from the internal vector generator 203 (FIG. 25) into scratch pad register RY (step 211). The sequence then proceeds to the MTRAP sequence shown in FIG. 27B.

The MTRAP sequence is depicted in FIGS. 27B and 27C. The contents of the program counter from register R7 (74, FIG. 2) and status register 71 are first transferred to memory locations that are identified by the stack pointer R6 (75, FIG. 2). A new status word and program count (that is, the address of the next instruction to be executed) are retrieved from a location determined by the interrupt vector and loaded into the respective status register 71 and program counter register R7 (74, FIG. 2). Thus, in sequences 220 and 221 the contents of the current status register 71 and program counter 74 are transferred to the locations in memory indicated by the stack pointer register R6 (75, FIG.2). The contents of the RZ register are then tested (step 230), and if they equal "one", a power up/restart address as determined by the condition of operating mode register stages (15:13) (FIG. 3) is loaded into the program counter register R7 of register stack 70. The contents of the stack pointer register R6 (75, FIG. 2) are then initialized (step 231), interrupts are checked (step 232), scratch pad register RZ is cleared (step 233) and the MTRAP sequence is exited.

If the contents of the RZ register do not equal "one" in step 230, RZ that is, if the HALT signal was not asserted in step 202, then following step 221 the interrupt vector contained in the RY register is used to retrieve the new program count and processor status word of the interrupt service routine (step 241). The MTRAP sequence is then exited, and the interrupt service routine is begun.

The foregoing description is limited to a specific embodiment of this invention. The specific embodiment disclosed herein is disclosed in the form of gate-level logic. One preferred embodiment, however, includes circuitry in the form of metal-oxide-semiconductor (MOS) circuits. The correspondence between the gate-level logic disclosed herein and "MOS" circuitry will be apparent to one skilled in the art.

It will be apparent that this invention can be practiced in central processing units having diverse basic construction or in central processing units that use different internal circuitry than is described in the specification and attain some or all of the foregoing objects and advantages of this invention. Therefore it is the object of the appended claims to cover all such modifications and variations which come within the true spirit and scope of this invention.

What is claimed as new and desired to be secured by Letters Patent of the United States is:

1. A central processor unit for connection in a data processing system, the central processor unit including:
   A. means for performing an information transfer, including means for transmitting information signals, including address signals and data signals, to, and means for receiving data signals and interrupt request signals from, other units in the data processing system over respective information and interrupt request transfer lines;
   B. an operating mode register including a first stage having a set condition and a reset condition; and
   C. means connected to said first stage of said operating mode register and to said transmitting means and said receiving means for enabling the transmitting means to contemporaneously transmit data signals over the information signal transfer lines and address signals over the interrupt request signal transfer lines when said first stage is set, and for alternately transmitting address signals and data signals over the information signal transfer lines when said first stage is reset.

2. A central processor unit as defined in claim 1 wherein said operating mode register additionally includes another stage having a set and a reset condition, the central processor unit further including:
   a. means for connection to a source of clocking signals,
   b. means for generating timing signals in response to said clocking signals,
   c. means for connection to timing signal transfer line and to said other stage of said operating mode register for selectively transmitting to other units in the data processing system said timing signals when said other stage is reset and free-running clocking signals when said other stage is set.

3. A central processor unit as defined in claim 2 wherein said timing signal generating means includes means for generating timing signals having a plurality of phases, said selectively transmitting means transmitting timing signals of one of said phases when said other stage of said operating mode register is set.

4. A central processor unit as defined in claim 3 wherein said selectively transmitting means comprises:
   a. means for generating a timing signal in response to the said one of said timing signal phases including:
      (i) a flip-flop set in response to the generation of said one of said timing signal phases when enabled by the set condition of said other stage of said operating mode register, and
      (ii) coincidence means enabled by the output of said flip-flop and said one of said timing signal phases to transmit a timing signal in response to the generation of said timing signal phase; and
   b. means for generating said free-running clocking signals including:
      (i) means connected to be clocked by said clocking signals for generating an enabling signal, and
      (ii) coincidence means connected to said enabling signal generating means and said flip-flop for generating said free-running clocking signals when said flip-flop is reset.

5. A central processor unit as claimed in claim 1 wherein said operating mode register additionally includes another stage having a set and a reset condition, the central processor unit further including timing signal generating means for generating timing signals having a plurality of phases, said central processor unit including means for transmitting a selected number of phases in response to the said other stage of said operating mode register having the set condition and for transmitting an additional phase in response to said other stage having the reset condition.

6. A central processor unit as claimed in claim 5 wherein said timing signal generating means includes a plurality of flip-flops each associated with one of the timing signal phases, all of the flip-flops being connected to be clocked in response to the clocking signals, the flip-flops being sequentially connected so that each flip-flop associated with a timing signal phase is enabled by the flip-flop associated with a preceding timing signal phase, said timing signal generating means further including means connected to said other stage of said operating mode register for coupling the output signal from one flip-flop to the flip-flop associated with the next timing signal phase in response to the set condition of said other stage, and for coupling the output signals from the flip-flop to the flip-flop associated with the second succeeding timing signal phase in response to the reset condition of said other stage.

7. A central processor unit as claimed in claim 1 wherein said operating mode register additionally includes another stage having a set and a reset condition, said central processor unit including means for performing one information transfer in response to the other stage having a set condition and for performing two successive transfers in response to the other stage having a reset condition comprising:
   a. control means connected to said information transfer means for enabling said information transfer means to perform an information transfer, said control means generating a transfer signal in response thereto;

b. time state means responsive to the set condition of said other stage of said operating mode register and to the transfer signal from said control means for generating an second transfer enabling signal to enable said control means to enable a second information transfer.

8. A central processor unit as defined in claim 7 wherein said control means further includes a memory address register for storing the address of a location with respect to which a transfer is to take place, said control means further including means responsive to said second transfer enabling signal to increment the address stored in said memory address register.

9. A central processor unit as claimed in claim 1 wherein said operating mode register additionally includes another stage having a set and a reset condition, said central processor unit further including:
   a. control means for enabling an information transfer, including a refresh transfer when said other stage has a reset condition,
   b. means for generating a refresh address, and
   c. means connected to said control means and said refresh address generating means for selectively transmitting the refresh address as information signals and refresh control signals when enabled by said control means.

10. A central processor unit as claimed in claim 9 wherein said control means further includes a memory address register for storing an address, said selective address transmitting means comprising a multiplexer connected to said control means for selectively transmitting the refresh address or the contents of said memory address register when enabled by said control means.

11. A central processor unit as claimed in claim 1 wherein said operating mode register additionally includes another stage having a set and a reset condition, said information transfer means further including means for generating control signals to control the transfer of information, said control signals generating means being responsive to said other stage for selecting the control signals to be transmitted.

12. A central processor unit as claimed in claim 1 wherein said operating mode register additionally includes another stage having a set and a reset condition, said information transfer means further including means for generating control signals to control the transfer of information, said control signal generating means being responsive to said other stage for controlling the timing of a selected control signal including:
   a. means for generating a timing signal and a delayed timing signal;
   b. means responsive to the set condition of said other stage, the selected control signal and said timing signal for generating a control signal to control the transfer of information, and
   c. means responsive to the reset condition of said other stage, the selected control signal and said timing signals for generating the control signal to control the transfer of information.

* * * * *